(12) United States Patent
Tadayon

(10) Patent No.: US 8,443,571 B2
(45) Date of Patent: May 21, 2013

(54) WIND POWER EQUIPMENT AND ASSEMBLY

(75) Inventor: Saied Tadayon, Potomac, MD (US)

(73) Assignee: BTPatent LLC, Potomac, MD (US)

( * ) Notice: Subject to any disclaimer, the term of this patent is extended or adjusted under 35 U.S.C. 154(b) by 157 days.

(21) Appl. No.: 12/886,558

(22) Filed: Sep. 20, 2010

(65) Prior Publication Data

US 2011/0067353 A1 Mar. 24, 2011

Related U.S. Application Data

(60) Provisional application No. 61/244,024, filed on Sep. 19, 2009.

(51) Int. Cl.
*E04B 1/00* (2006.01)

(52) U.S. Cl.
USPC .......................... 52/745.18; 52/121; 52/123.1

(58) Field of Classification Search
USPC ................. 52/745.17, 745.18, 843, 848, 121, 52/122.1, 123.1, 745.03, 745.04, 834, 651.01, 52/651.07

See application file for complete search history.

(56) References Cited

U.S. PATENT DOCUMENTS

| | | | |
|---|---|---|---|
| 3,714,304 A * | 1/1973 | Carner | 264/572 |
| 6,470,645 B1 * | 10/2002 | Maliszewski et al. | 52/745.18 |
| 8,240,051 B2 * | 8/2012 | Fedock et al. | 29/890.033 |
| 2006/0151767 A1 * | 7/2006 | Wobben | 254/334 |
| 2007/0253824 A1 * | 11/2007 | Eyb | 416/223 R |
| 2008/0216301 A1 * | 9/2008 | Hansen et al. | 29/428 |
| 2009/0211174 A1 * | 8/2009 | Henderson et al. | 52/40 |
| 2012/0131880 A1 * | 5/2012 | Delago et al. | 52/745.18 |

FOREIGN PATENT DOCUMENTS

| | | | |
|---|---|---|---|
| GB | 2451191 A | * | 1/2009 |
| JP | 2004308521 A | * | 11/2004 |

* cited by examiner

*Primary Examiner* — Brian Glessner
*Assistant Examiner* — Adam Barlow
(74) *Attorney, Agent, or Firm* — Saied Tadayon; Bijan Tadayon

(57) ABSTRACT

In one example, we describe a method of construction and assembly for a very large wind power generator (or windmill or wind turbine unit), for sea, coast line, or in-land installment. In other examples, we describe the improvements on components of a wind power generator (or windmill or wind turbine unit). In one example, we describe a method of avoiding or minimizing problems with the weather forecasts or military radar interferences, for large wind mills or wind farms.

20 Claims, 43 Drawing Sheets planar cross section view of a vertical shaft windmill, as helix, around a vertical shaft or axis, e.g. as attached to unit of Fig. 22 (Base), instead of the sail Array/pattern of antennas for absorbing incident radar signal at various angles Impedance Matching Load or Resistor, e.g., 377 Ohm

WIND POWER EQUIPMENT AND ASSEMBLY

RELATED APPLICATION(S)

This application is a continuation of and related to a prior provisional application, Ser. No. 61/244,024, filed 19 Sep. 2009, with the same title and inventor, assigned to the same assignee.

BACKGROUND OF THE INVENTION

The wind power and renewable energy become very important these days. We present here new features and improvements on this technology (as described below), which are advancements on any prior art.

SUMMARY OF THE INVENTION

In one embodiment, we describe a method of construction and assembly for a very large wind power generator (or windmill or wind turbine unit), for sea, coast line, or in-land installment. In other embodiments, we describe the improvements on components of a wind power generator (or windmill or wind turbine unit). In one embodiment, we describe a method of avoiding or minimizing problems with the weather forecasts or military radar interferences, for large wind mills or wind farms.

DETAILED DESCRIPTION OF THE EMBODIMENTS

Constructing Tower

Figure 1:
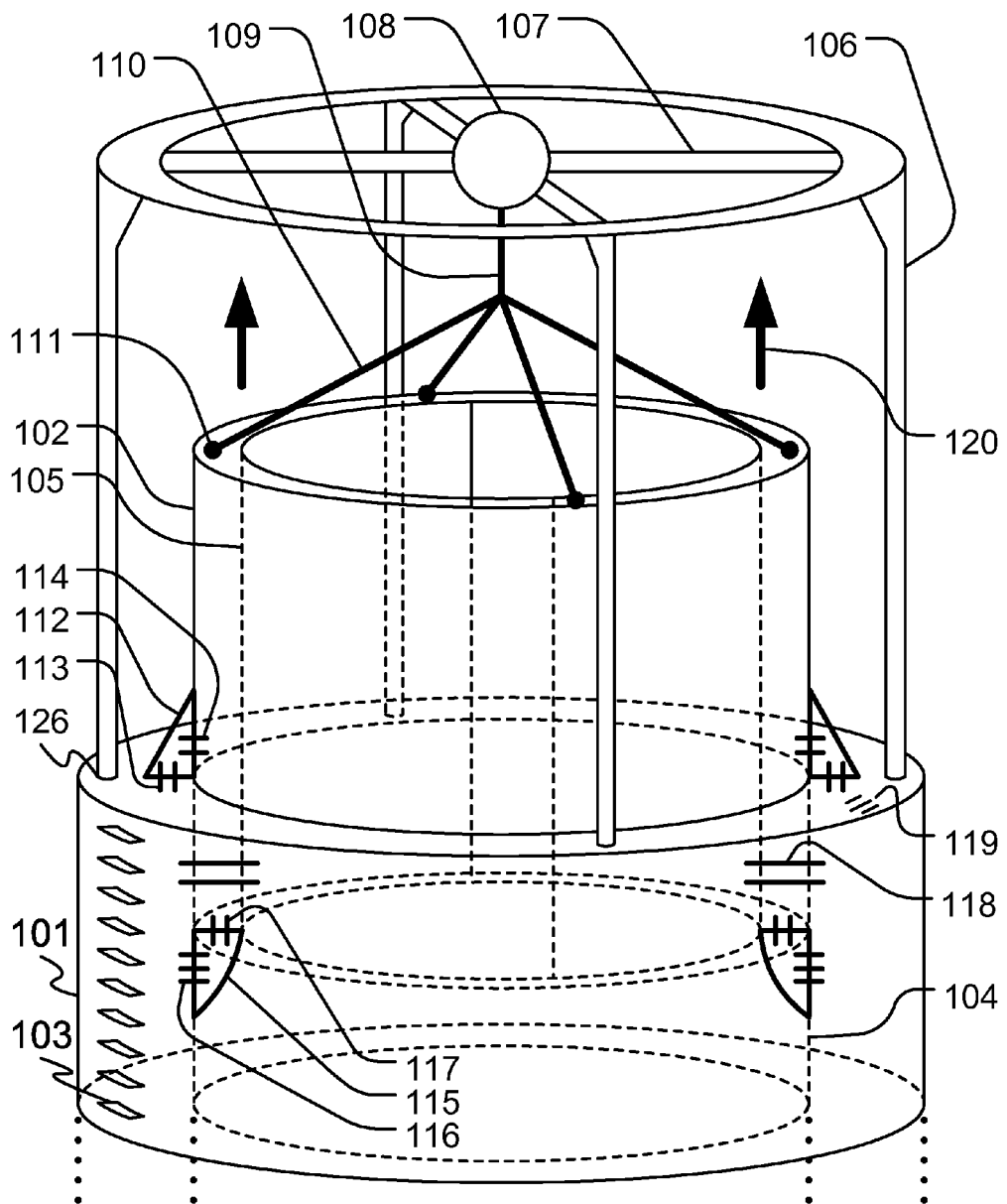
FIG. 1 shows one embodiment of this invention, for assembling the towers, e.g. the large ones.

In an embodiment, the wind turbine tower (e.g., tapered cylindrical shape) is constructed by erecting pieces on top of each other, instead of the whole piece. This is beneficial for large tower and for reducing the transportation cost of the tower pieces to the operation site. In one embodiment, (see, e.g., FIG. 1) the tower piece 101 and tower piece 102 have dimensions so that tower piece 102 can be pulled up or pushed up through the cavity inside tower piece 101, e.g., the outside dimension of tower piece 102 is smaller than the inside cavity (104) of tower piece 101. In one embodiment, tower piece 102 also has an inside cavity (105), in order to continue constructing next tower piece or to provide access (e.g., for electrical, mechanical, assembly, or maintenance) to higher pieces or nacelle/rotor.

In one embodiment, physical access is provided at the side of tower piece(s). For example, one or more ladders are provided at the outside (103) of tower piece or inside of the tower piece (for example, embedded in outer surface or inner surface of the cylinders, as a lip coming out of the surface, or as a dent going in the surface). In one embodiment, such ladder(s) are formed by dents in the structure.

In one embodiment, tower structure pieces are folded inside each other, or extended telescopically, having various cross sections such as circular, oval, triangular, hexagon, octagon or rectangular.

In one embodiment, tower piece 102 is pulled up (120) from inside tower piece 101 by attached cable(s) (110). The cables may be attached on top (111), outside, or inside of tower piece 102. In one embodiment, the attached cable(s) (110) are pulled by one or more cables (109) through a pulley assembly (108) of a crane assembly (107) which is supported by one or more posts (106) placed on (126) or attached at the side of tower piece 101. The motor for pulling the cable (109) can be, for example, at the crane assembly (107) or at the ground level. In one embodiment, the cable (109) is pulled through the cavities of tower pieces (104 and 105).

In one embodiment, once tower piece 102 is in place with respect to tower piece 101, tower piece 102 is secured to tower piece 101. In one embodiment, the connections between the pieces are achieved by horizontal bolts or rods (118), for example, through tower piece 102 walls to the inside wall (104) of tower piece 101. In one embodiment, spring-loaded pins between the tower pieces are used to snap them in place, e.g., before securing tower piece 102 to tower piece 101. In one embodiment, tower piece 102 is secured at its side to the top of tower piece 101 by one or more support pieces (112) which is fastened to tower piece 102 by, for example, bolts or rods (114) or welding, and fastened to tower piece 101 by, for example, bolts or rods (113) or welding.

In one embodiment, the supporting pieces (112) are triangular shape, but they can have any shape in other embodiments. In one embodiment, the supporting piece(s) form a ring around tower piece 102. In one embodiment, tower piece 101 is supported from bottom (e.g., as depicted in FIG. 1) by one or more supporting pieces (115) and secured to the inside cavity (104) of tower piece 101 by fastening means or devices (116), such as rods or bolts or welding. In one embodiment, tower piece (102) is fastened to the supporting pieces (115) by fastening means or devices (117), such as rods or bolts or welding. In one embodiment, the supporting piece(s) (112) form a ring around supported tower piece (102). In one embodiment, the supporting piece(s) (115) form a ring below supported tower piece (102).

Figure 2:
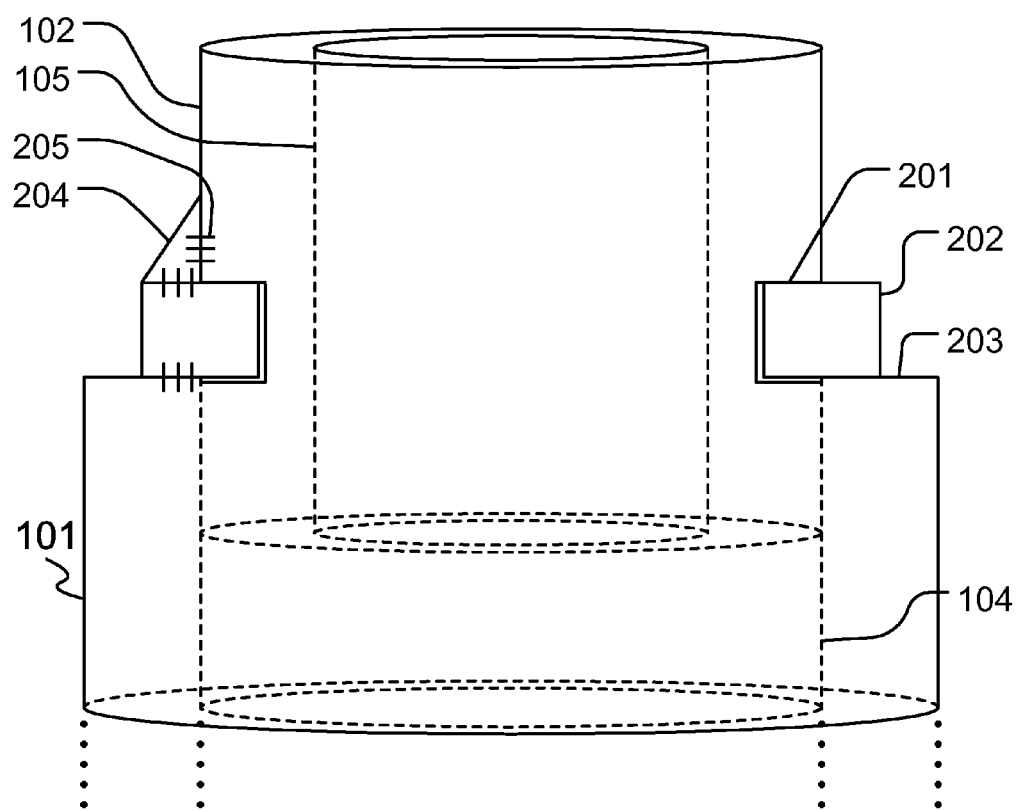
FIG. 2 shows one embodiment of this invention, for assembling the towers, e.g. the large ones.

In one embodiment, e.g., as shown in FIG. 2, tower piece 102 is supported on tower piece 101 by one or more supporting pieces (202) placed around tower piece 102, in one or more notches or dents (201) at outside surface of 102, resting on top of tower piece 101. In one embodiment, the notches (201) form a ring dent/notch around tower piece 102. In one embodiment, the supporting pieces (202) are further fastened to the tower pieces by fastening means or devices, such as bolts or welding. In one embodiment, the supporting piece(s) (202) have extensions (204) that are fastened to the sides of 102 by fasteners (205), such as bolts or rods. In one embodiment, the supporting piece(s) (202) form a ring around the supported tower piece (102).

In one embodiment, once tower piece 102 is secured to tower piece 101, the crane assembly 107 is used to pull the next tower piece up from within tower piece 102. In one embodiment, crane assembly is set up based on tower piece 102, before pulling the next tower piece up. In one embodiment, the crane support post are attached to tower piece 102, before dismantling the crane post(s) (106) that are supported by tower piece 101.

In one embodiment, e.g., as depicted in FIG. 1, the crown assembly is moved and attached to the top, outside or inside of tower piece 102, once tower piece 102 is in place and secured. For example, additional (e.g., extendable) posts are attached to the crane assembly (107) and tower piece 102, before disengaging the posts (106) connecting the crane assembly from the tower piece 101.

Figure 3A:
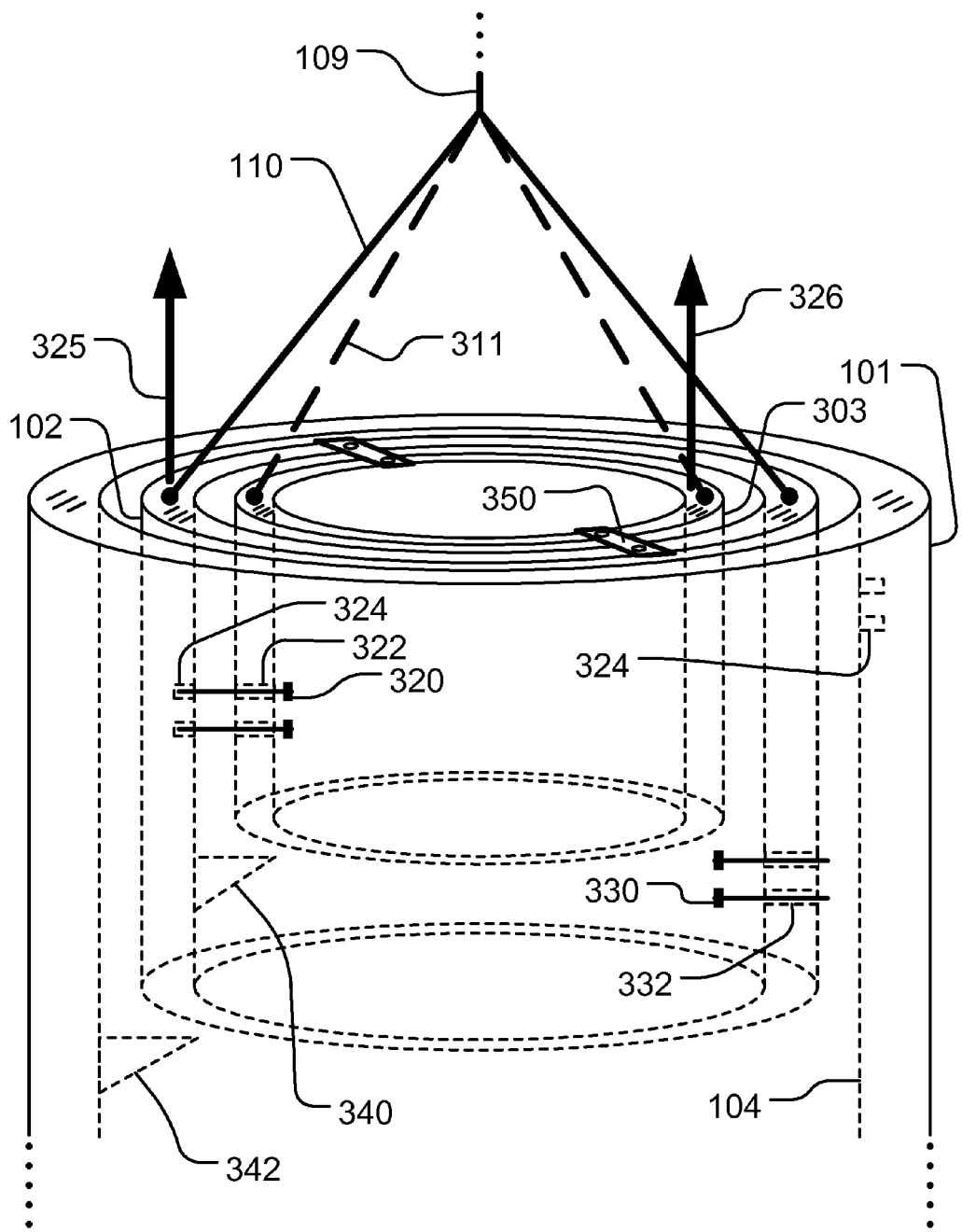
FIG. 3a-b shows one embodiment of this invention, for assembling the towers, e.g. the large ones.

In one embodiment, the tower pieces are pulled from the ground level, one at the time. In one embodiment, as shown in FIG. 3(a), the tower pieces (101, 102, and 303) are temporarily held together, e.g., by fastening means from top (350), bottom, or sides (320), or by pulling means, such as cable. When pulling (or pushing) tower piece 102 up from within 101, in one embodiment, tower piece 303 is also pulled (or pushed) at the same time, having been held together with tower piece 102. After 102 is pulled up through and secured to 101, then 303 is released or disassociated from 102, and pulled (or pushed) up through 102.

In one embodiment, the initial arrangement of the tower pieces before pulling them through each other, as shown in FIG. 3(a), is to have their tops at or close to be flush with each other. In one embodiment, the crane assembly is readily connected to 303 by attaching pulling cables (e.g., 311) to 303, and releasing cables (110) from 102. In one embodiment, the cables are reused, so that pulling cables 110 are used in place of 311 after detachment from 102.

In one embodiment, the tower pieces are temporarily held together, as depicted in FIG. 3(a) (but not necessarily flushed on top). In such an arrangement, the cable (311) connections (111 in FIG. 1) are made to the inner tower piece (e.g., 303 in FIG. 3(a)). When pulling up (326) cable 109, both tower pieces 102 and 303 are pulled up, given that they are held together by fasteners (e.g., 350 or 320), in one embodiment. When tower piece 102 is in place and secured, 102 is disassociated from 303 (e.g., by disengaging 350 or 322 from 324), and 303 is pulled up from within 102 via cable 311. In this embodiment, the pulling cable(s) (311) do not have to be switched between the tower pieces 102 and 303.

Figure 3B:
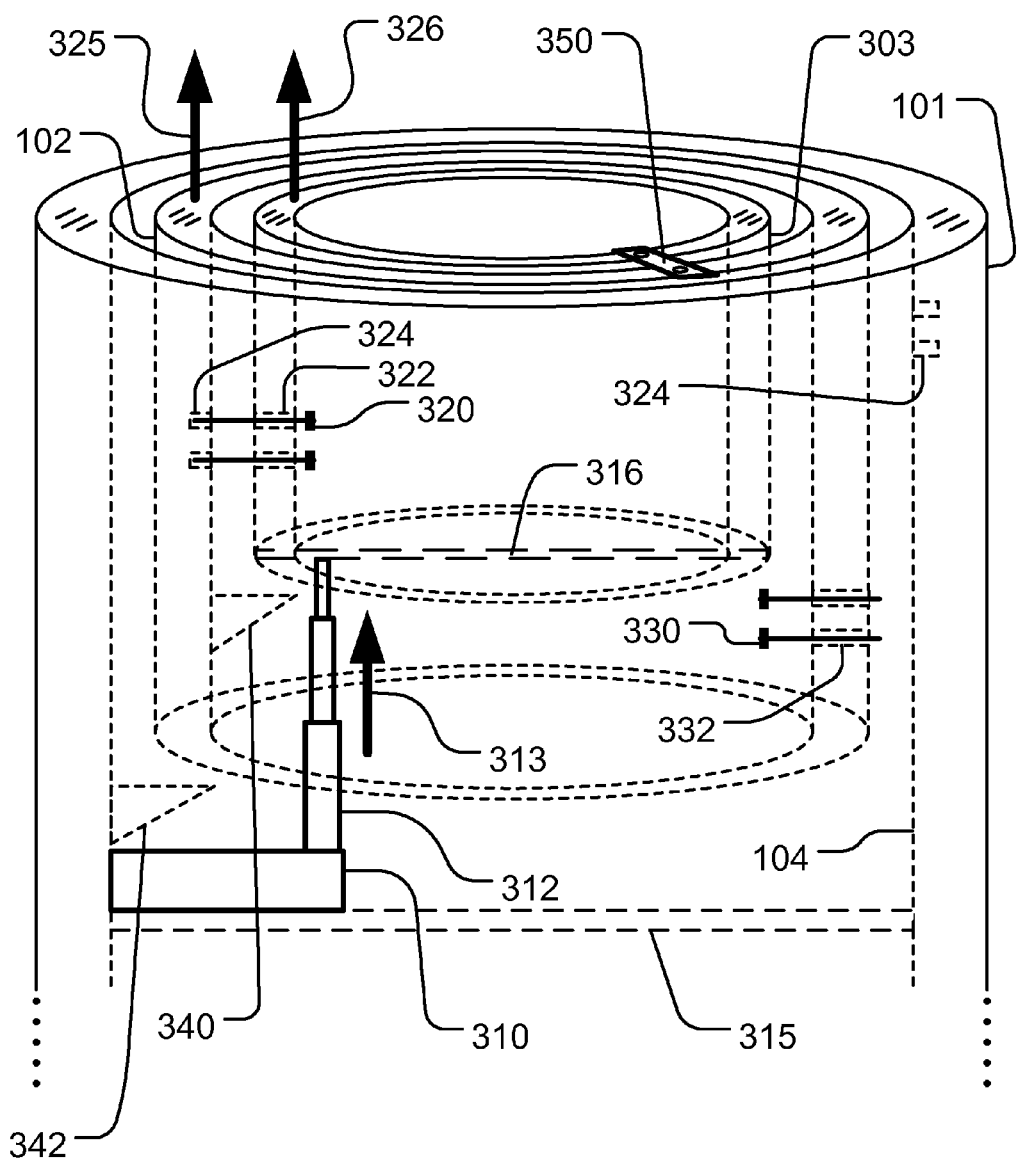

In one embodiment, e.g., as depicted in FIG. 3(b), the tower pieces are pushed from bottom, instead of being pulled from top. In one embodiment, the pieces are pushed up using a lift (310) (e.g., a hydraulic lift). In one embodiment, the lift is based on the ground. In one embodiment, the lift is secured to the inner cavity of a tower piece (e.g., 104) to push up the other tower piece(s) (e.g., 102 and 303). In one embodiment, the position of the lift changes to lift the next tower piece, e.g., by moving and securing the lift to the next tower piece cavity (e.g., 105) to push up the next tower piece (e.g., 303 in FIG. 3(b)). In one embodiment, the tower pieces (e.g., 102 and 303) are held together temporarily (e.g., via rod/bolts 320 or connector 350) and they are pushed up together at the same time, as 102 is pushed up through 101.

In one embodiment, the lift (310) pushes up (313) tower piece 303 by for example pushing against a frame (316) attached to 303. With 102 being held temporarily with 303, the 102 is also pushed up at the same time. After positioning and securing 102 to 101, tower piece 102 is disassociated from 303, and 303 is again pushed up (this time through 102) without (necessarily) changing the lift position with respect to 303. In one of such embodiments, the lift support is at ground, or attached to 101, or it is changed to 102, while keeping the lift position at 303. In one embodiment, the lift arm (312) is telescopic, as illustrated in FIG. 3(b).

In one embodiment (e.g., see FIG. 3(a) or 3(b)), when the tower piece 102 is pushed/pulled up and positioned with respect to tower piece 101, fastener means (330) (e.g., rod or bold) is aligned with the corresponding fastening means (324) (e.g., a notch) on inside cavity (104) of tower piece 101, and the tower pieces (101 and 102) are secured using those fasteners.

In one embodiment, fastener 320 which temporarily holds pieces 303 and 102 together via a hole (322) through 303 and a notch (324) at inside cavity of 102, can also be used to again secure 303 to 102 (using a notch locates higher than 324 in 102) once 303 is pulled/pushed up through 102 and positioned at its final position relative to 102.

In one embodiment, the stoppers (e.g., 340 and 342) are attached to the tower piece cavities to prevent the tower pieces to fall down (e.g., for safety or transportation purposes).

Figure 4A:
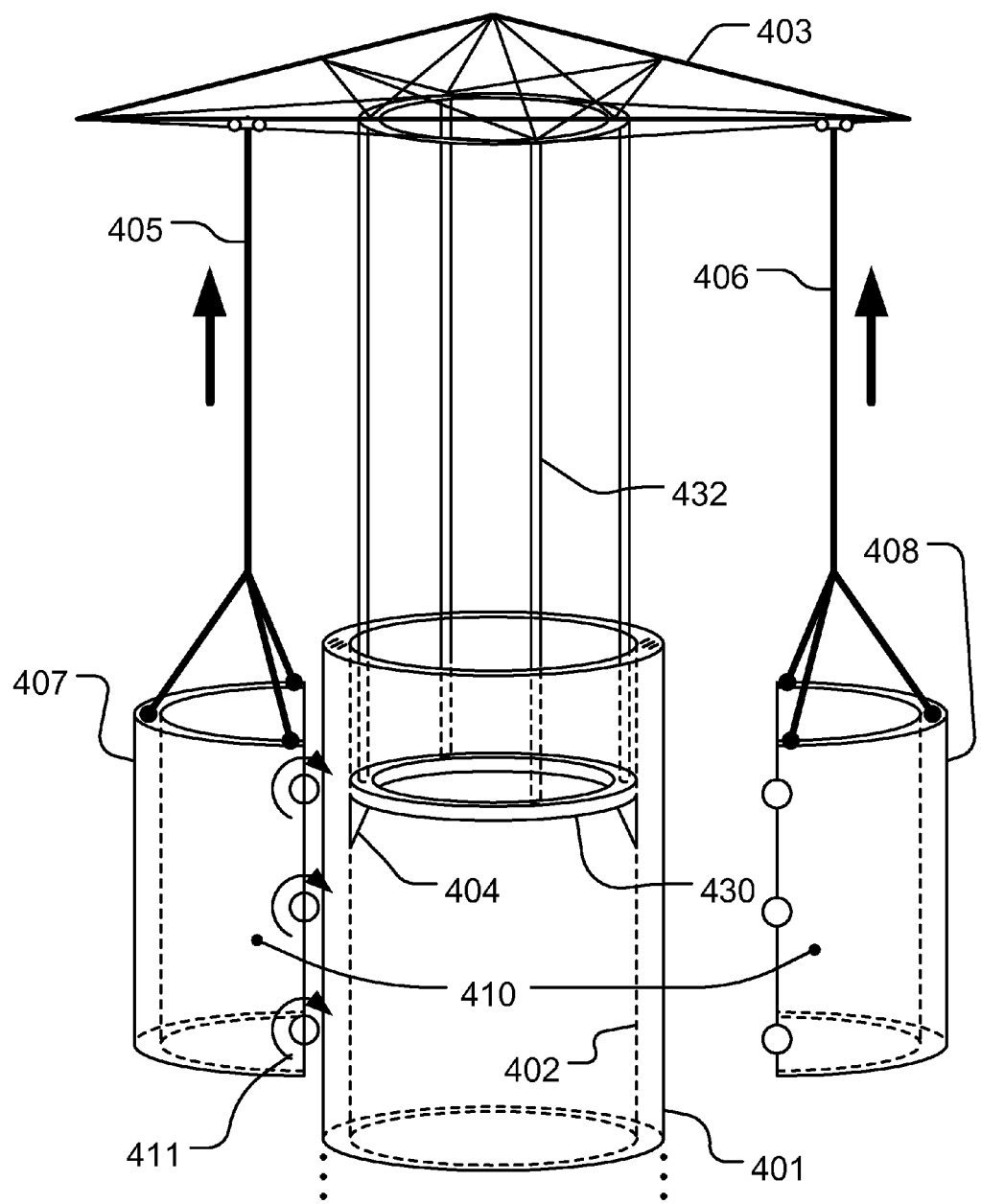
FIG. 4a-b shows one embodiment of this invention, for assembling the towers, e.g. the large ones.

In one embodiment, as shown in FIG. 4(a), the tower pieces are constructed on top of each other. In one embodiment, with tower piece 401 in place, tower piece set 410 is pulled up in two or more pieces (e.g., 407 and 408) by cables (e.g., 405 and 406) by a crane assembly (403) setup supported by posts (432) secured (404 and 430) within the cavity (402) of tower pieces 401. Once the pieces (407 and 408) are pulled on top of tower piece 401, they are attached together by fasteners and/or bolts or rods or welding. When pulling these pieces up, the crane assembly is set, so the pulled pieces do not crash into or grind against tower piece 401. In one embodiment, one or more spacers/rollers (411) are placed between 401 and 407 (or 408), when pulling the pieces up. In one embodiment, the spacer is a roller attached to tower piece 401. In one embodiment, the spacers are rollers attached to the pieces (407 or 408), e.g., as depicted in FIG. 4(a).

In one embodiment, the pieces (407 and 408) are pulled up and guided using groves, or outward notches placed vertically along the side of tower piece 401. In one embodiment, once the tower piece 410 is attached to tower piece 401, the crane assemble (403) is moved up through tower piece 410, in order to construct the next piece. In one embodiment, one position of the crane assembly (403) is used to construct multiple consecutive tower pieces, before moving (up) the crane assembly. In one embodiment, pieces (407 and 408) are pulled up at the same time, to provide more balance at the crane assembly. In one such embodiment, counterweight for the crane assembly may be avoided, as the pieces (407 and 408) balance the torque against the crane assembly.

Figure 4B:
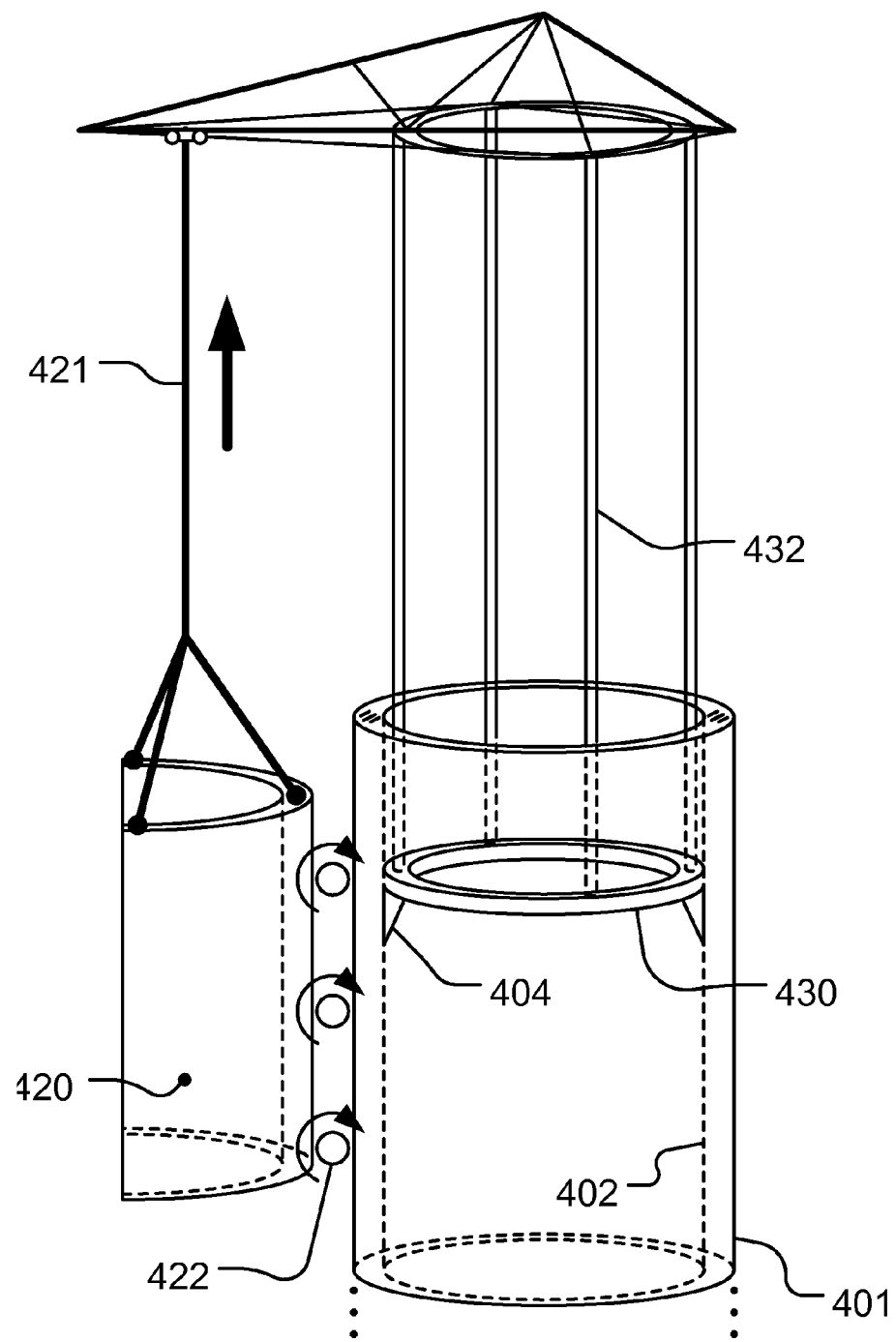

In one embodiment, as shown in FIG. 4(b), a tower piece (420) is pulled up with its outside surface facing the outside surface of tower piece 401 (already in place). In such an embodiment, the possibility of the piece (420) crashing into or grinding against tower piece 401 is reduced. Once the piece (420) is pulled on top of 401, in one embodiment, the piece is turned 180 degree, while being held by one or more cables (421). In one embodiment, one or more spacers (422) are placed between the pulled piece (420) and tower piece (401).

Figure 5:
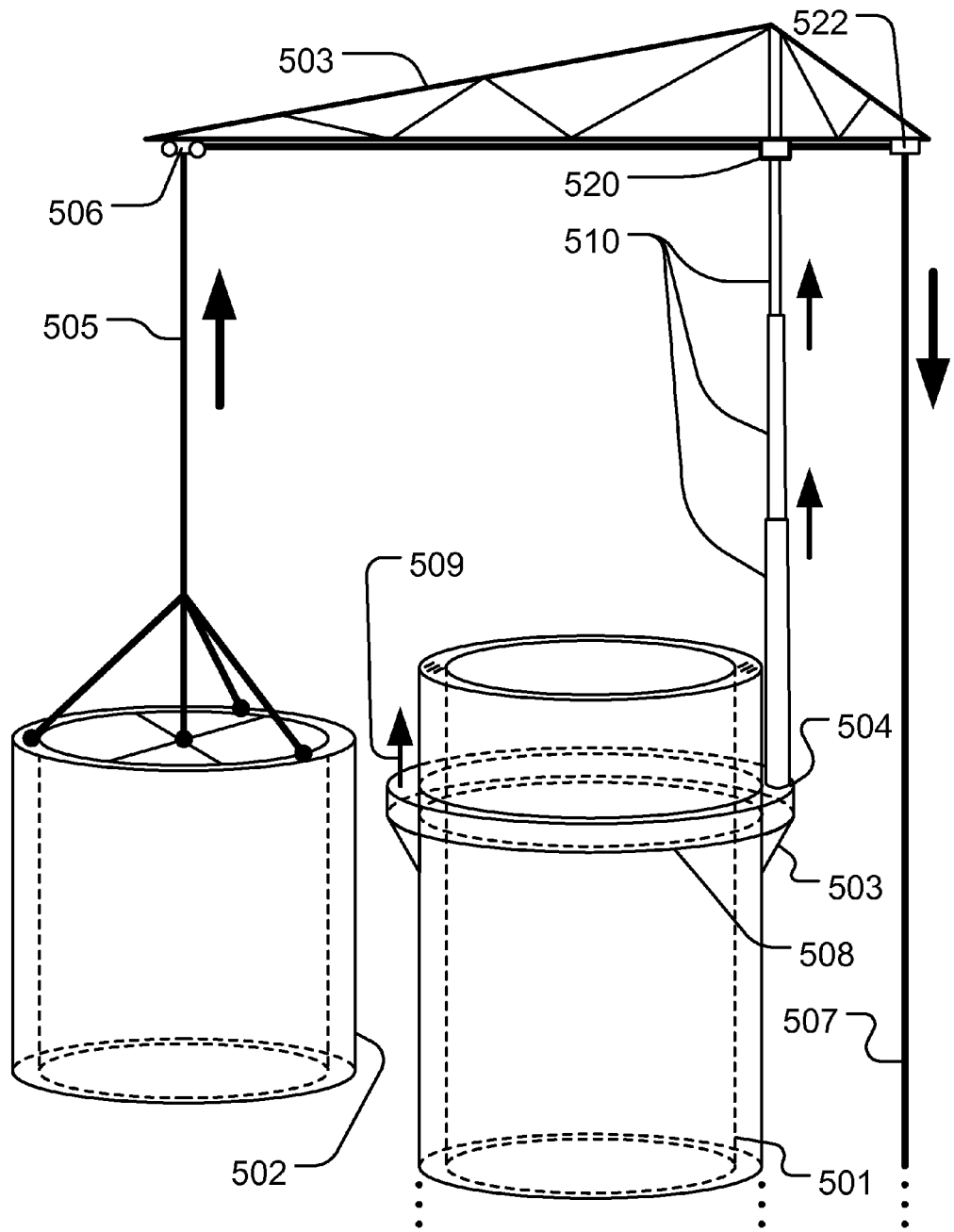
FIG. 5 shows one embodiment of this invention, for assembling the towers, e.g. the large ones.

In one embodiment, as for example shown in FIG. 5, tower piece 502 is pulled up alongside of already placed tower piece 501 by one or more cables (505) via a crane assembly (503) which is attached in one or more locations (504) to the outside of tower piece 501. In one embodiment, the crane has a lateral moving support (506) to position the pulled piece (502) into position above 501. In one embodiment, the motor on the crane is placed at the ground level providing the counterweight balance (507). In one embodiment, the motor is placed on the crane assembly. In one embodiment, the crane has extending and retracting arm (510). In one embodiment, multiple consecutive tower pieces are constructed with the crane assembly secured at the same position (504). In one embodiment, the crane assemble is secured to tower piece 501 by covering all or substantially all the periphery (508) around tower piece 501, at the attaching location.

In one embodiment, the crane attachment portion (508) has adjustable attachments, so that the crane can be attached to tower pieces with varying cross section sizes. In one embodiment, the tower pieces have notches and/or groves at the outside surface to facilitate the attachment of the crane assemble. In one embodiment, the crane assembly is attached to 501 using fasteners (e.g., bolts/rods). In one embodiment, the crane assembly (508 and 503) is moved up (509) in order to construct higher tower piece(s). In one embodiment, the crane assembly is secured to tower piece 501 in multiple locations, vertically, on the tower piece, to improve balancing the crane as tower piece 502 is pulled up. In one embodiment, the crane attachment portion (508) is further supported to the tower piece (501) via supporting attachment(s) 503 from below.

Figure 6:
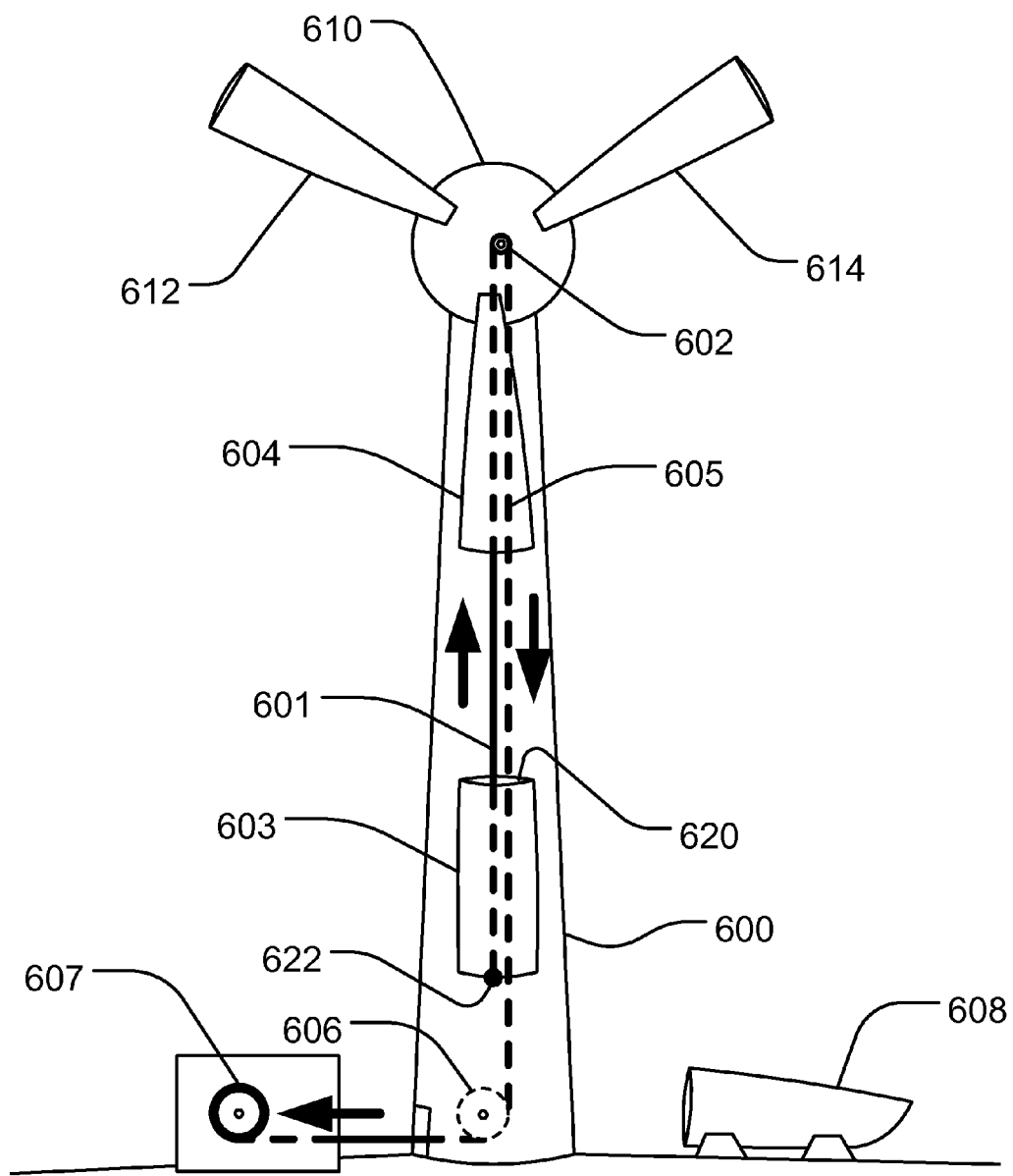
FIG. 6 shows one embodiment of this invention, for assembling the towers, e.g. the large ones.

Constructing Blades:

In one embodiment, as shown in FIG. 6, instead of assembling all the blades on the ground, and lifting them by a large crane, one or more cable(s) (601) and pulley assembly (602) at the hub or nacelle (on top of the tower) are used to pull up the blade piece(s) (603), until it snap in place with already placed blade piece (604). Then, the blade pieces (603 and 604) are secured together, for example, by knots/bolts. In one embodiment, the cable is pulled through blade piece 604, while in another embodiment, the cable is pulled from outside of blade piece 604.

In one embodiment, the blade pieces are constructed in stages, i.e., once piece 603 is secured to piece 604, the hub is rotated to position to construct similar corresponding piece for another blade. In such an embodiment, the balancing of the partial blades is improved during the construction. An embodiment of this invention is used to construct large blades that would be difficult or expensive to construct or transport as one piece.

The same cable (601) is used to pull and attach the next pieces of the blade by lowering the cable, attaching it to the next piece (608) on the ground, and pulling the next piece up (in one embodiment of this invention).

In one embodiment, the cable is pulled through the tower and by additional pulley(s) (606 and 607).

Figure 7:
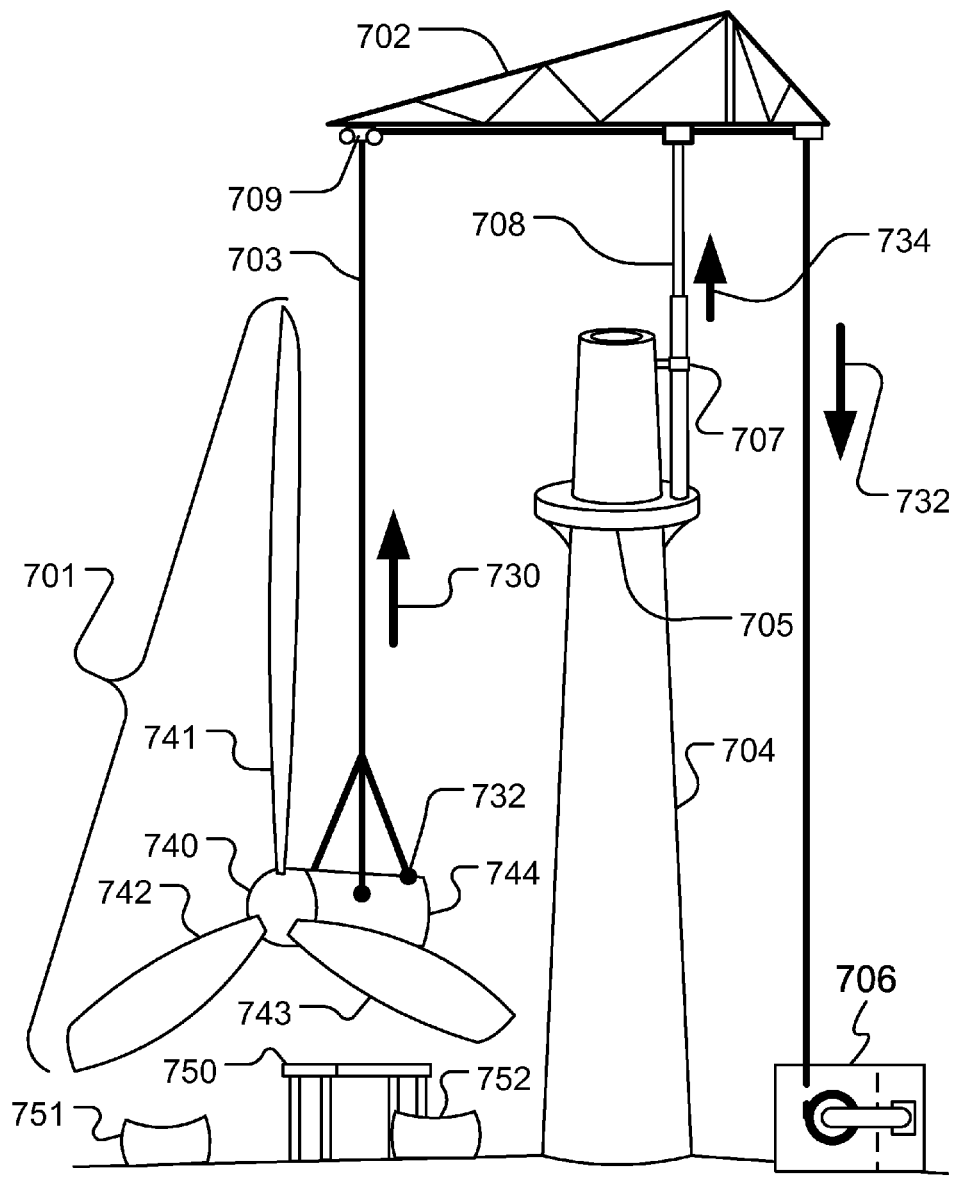
FIG. 7(a1), 7(a2), 7b, 7c, 7d shows one embodiment of this invention, for assembling the towers, e.g. the large ones.
Figure 7:
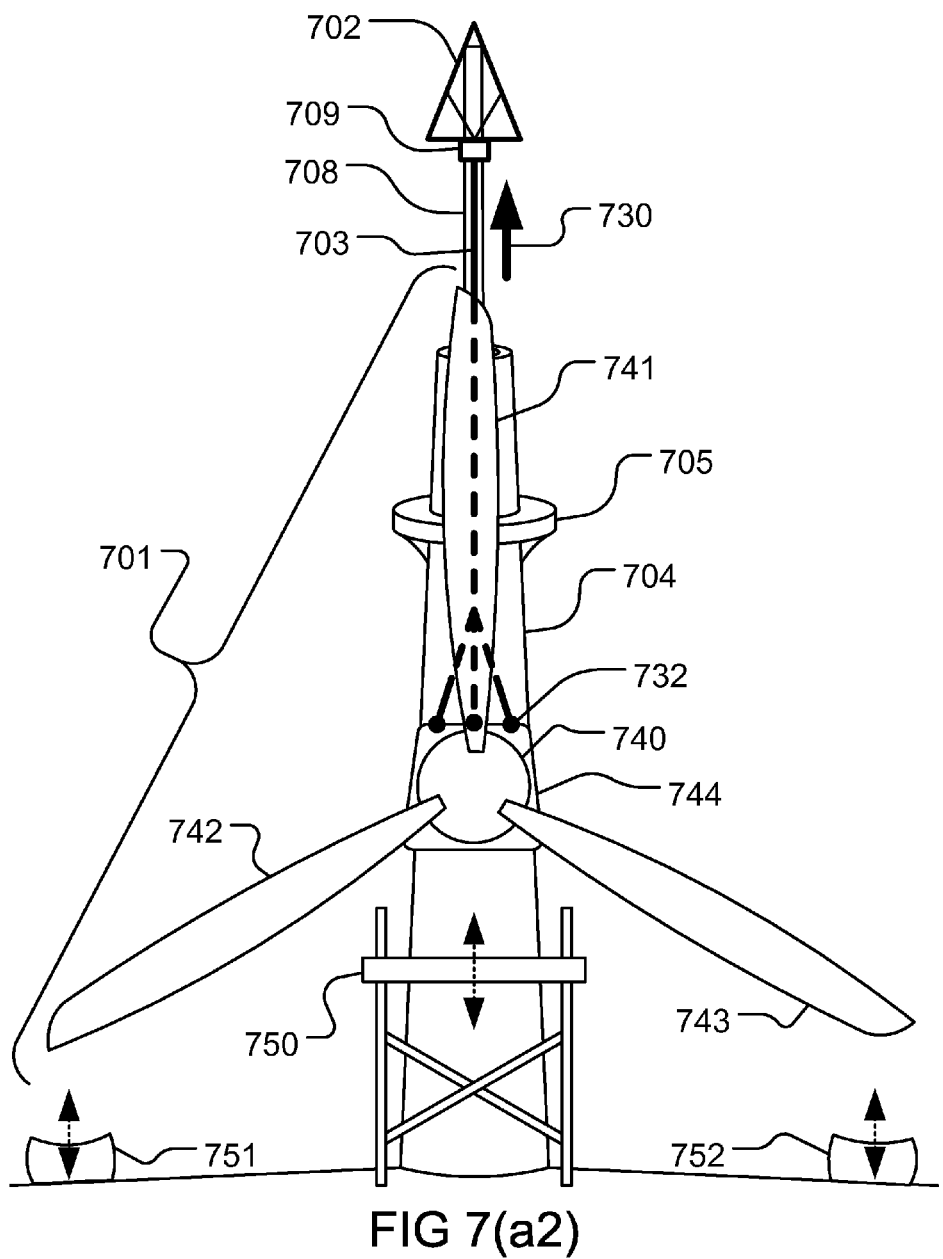
Figure 7B:
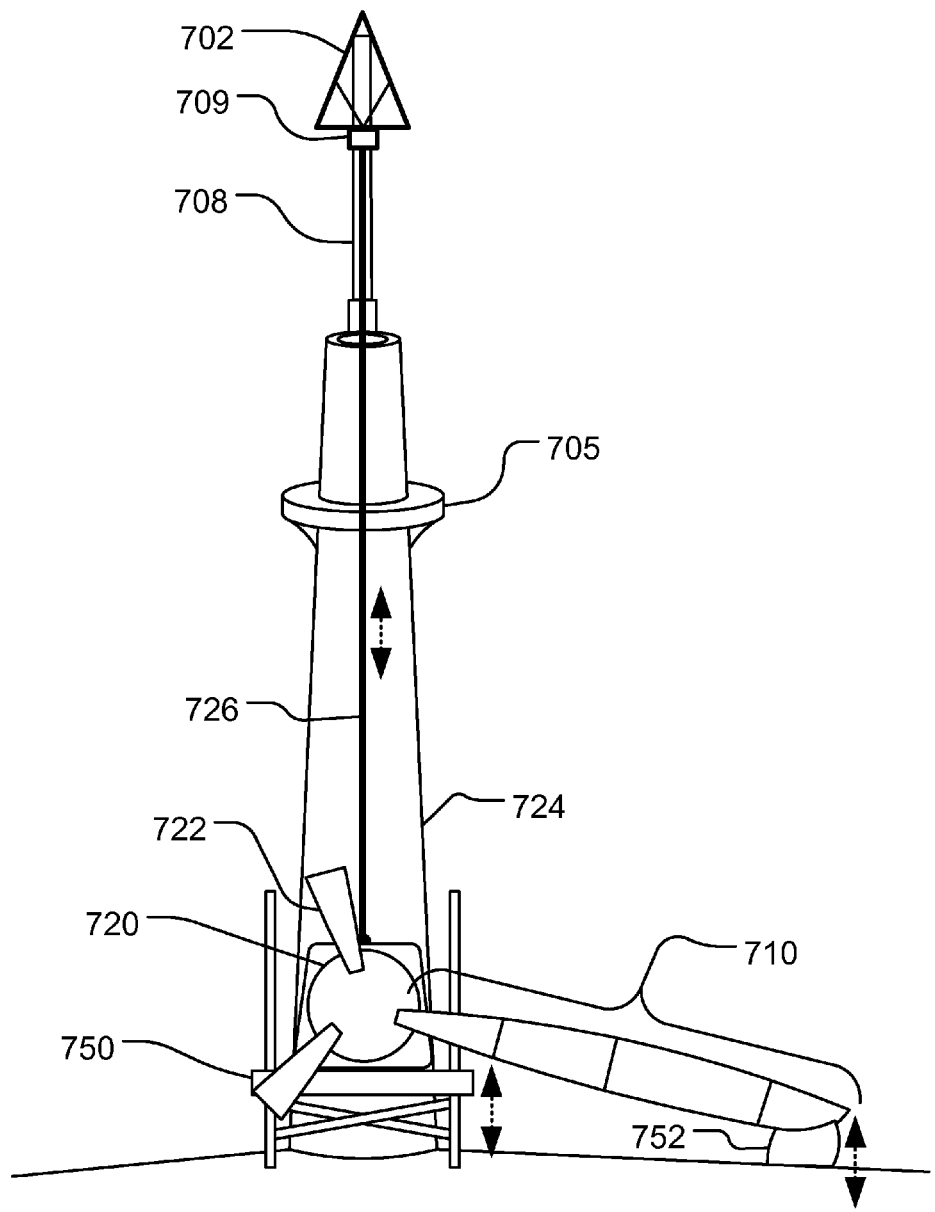
Figure 7C:
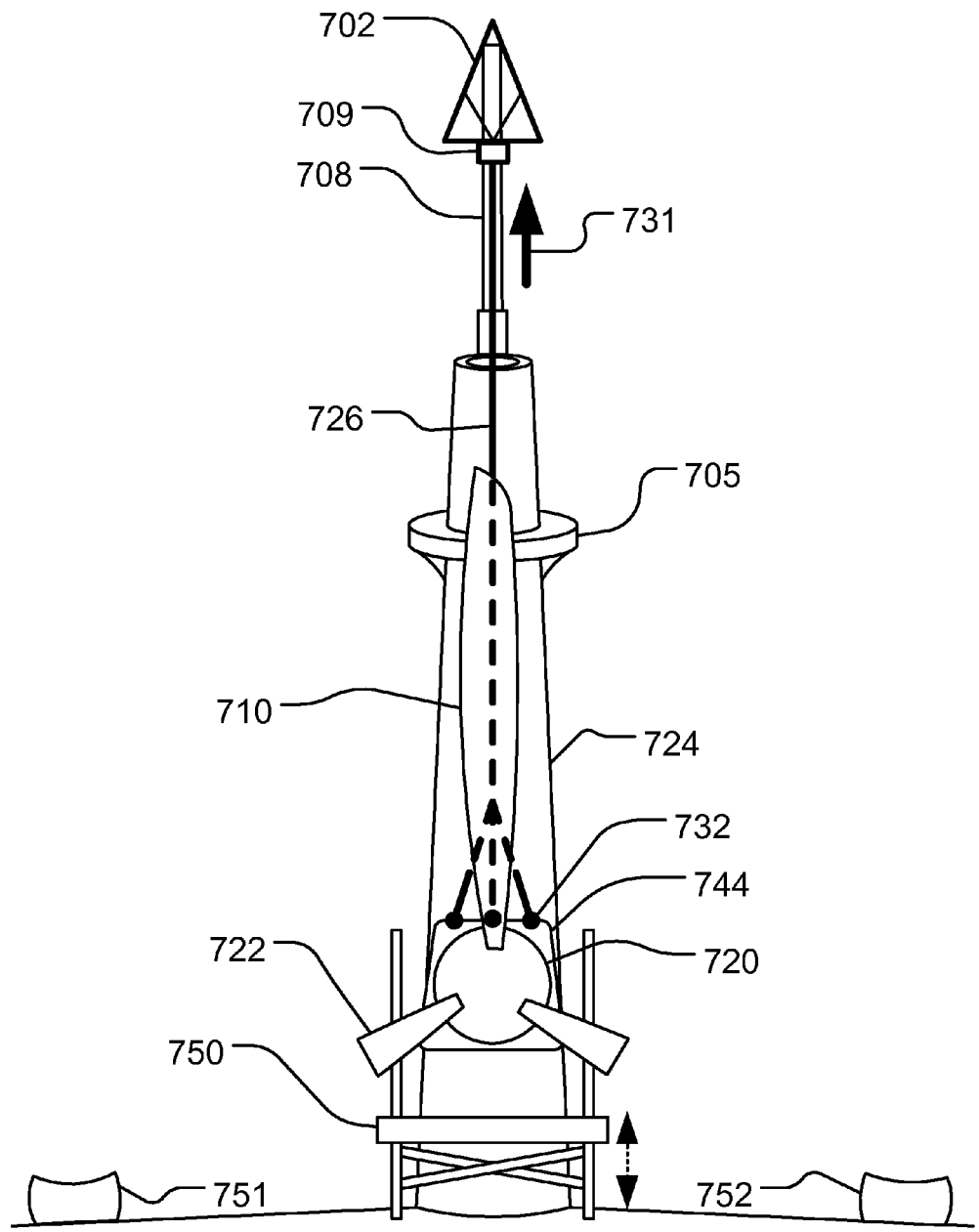
Figure 7D:
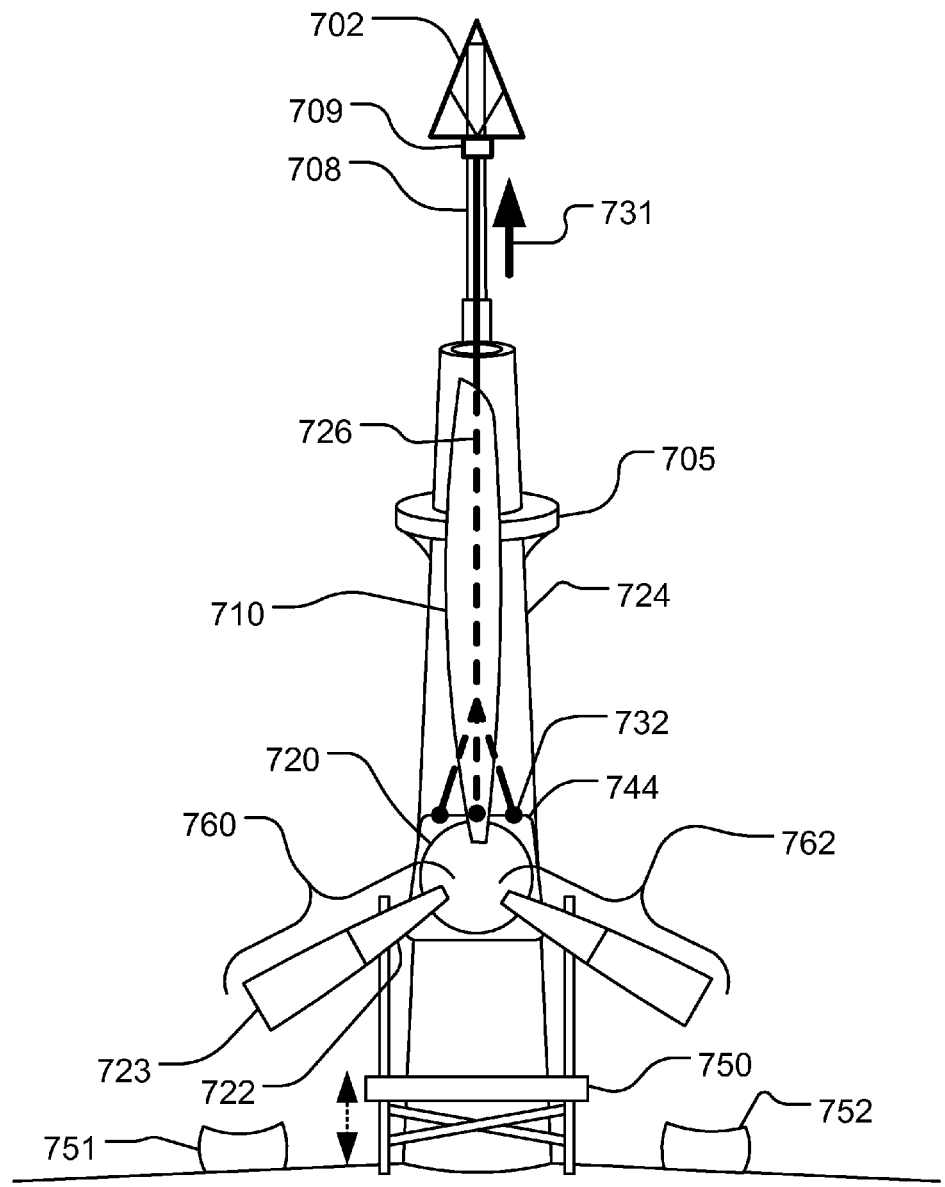

In one embodiment, as shown in FIGS. 7(*a*1) and 7(*a*2), the completed blade assembly 701 is pulled up by a crane assembly (702) by one or more cables (703), to be placed on top of the tower (704) already secured in place. In one embodiment, the crane assembly is supported (705) based on the tower. In one embodiment, e.g., in FIG. 7(*b*), a partial blade assembly is constructed at or close to ground by attaching one blade 710 to the hub (720). In one embodiment, blade 710 is constructed of multiple pieces connected together (e.g., at the site).

In one embodiment, (see e.g., FIG. 7(*c*)) other blade piece(s) (722) are only partially connected to the hub. In one embodiment, the hub with the attached blade pieces is pulled up by one or more cables (726) by a crane assembly (725) to the top of the tower (724). In one embodiment, as shown in FIG. 7(*c*), the hub is pulled up, while having completed blade 710 in upright position. In one embodiment, blade 710 is also pulled/guided by a cable to keep it upright. In one embodiment, as shown in FIG. 7(*d*), the blade piece(s) (723) are attached to the secured blade piece (722) close at the ground level, for ease of construction, while the partial blade assembly is held up by the crane assembly. To balance the blade assembly during construction, in one embodiment, additional cables are attached to the blade assembly and held at ground, to ease the construction.

In one embodiment, a platform (e.g., with adjustable height) (750) is used to place the nacelle and hub while connecting the blade pieces. In addition, other holders (e.g., 751 and 752) are used to secure the blade pieces while constructing the blades on or close to the ground. Such supports may be inflatable to allow adjustment to the height level for the support and provide a cushion for the blade pieces to rest during the assembly.

In one embodiment, the crane assembly (702) is secured on the tower (724) via a secured platform (705) and an arm (708).

In one embodiment, the blade pieces are pulled up by cable via inside the secured blade piece similar to that of FIG. 6, but having the hub hanging by one or more cables, instead of situated securely on top of the tower.

Figure 8:
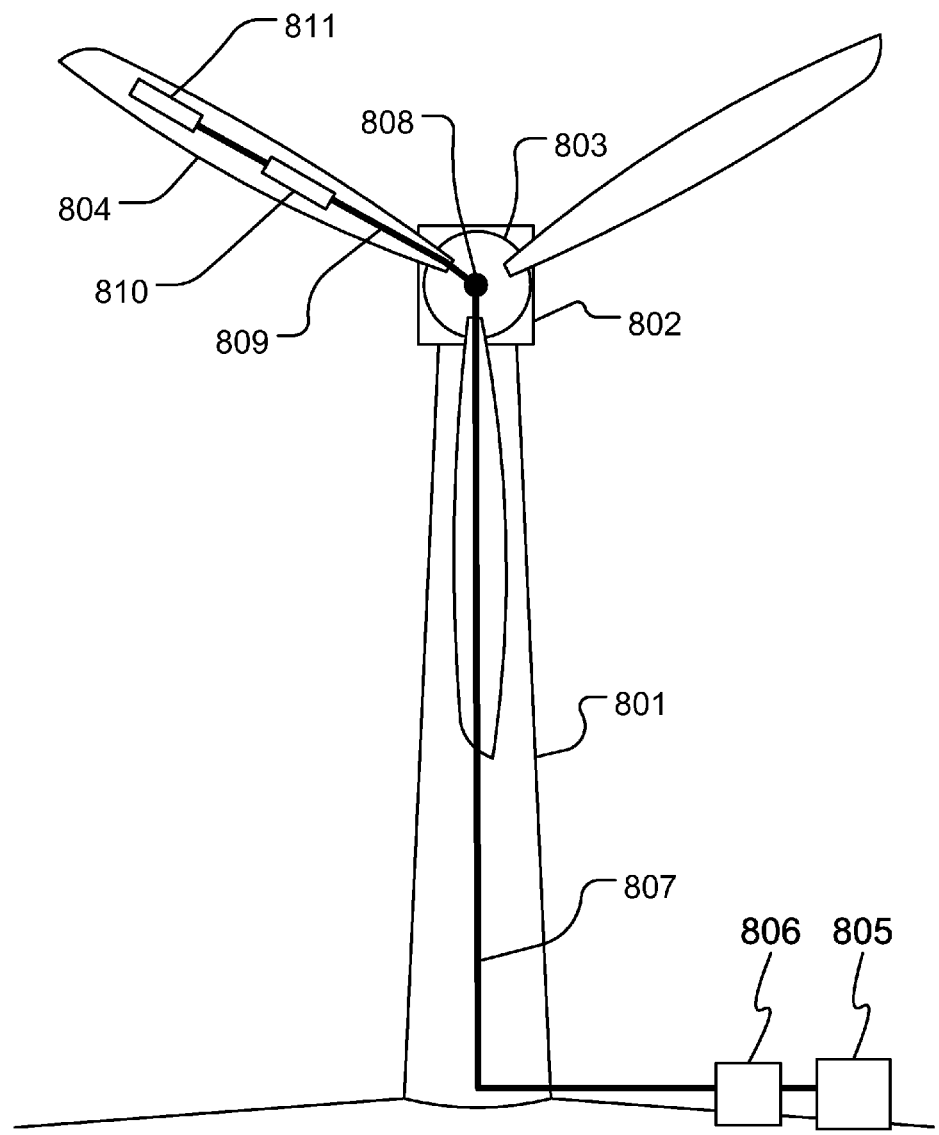
FIG. 8 shows one embodiment of this invention, for cavities in the blades.

Balancing Blades (Dynamically Variable Blade & Optimization & Stability):

In one embodiment, as shown for example in FIG. 8, one or more cavities or compartments or containers or boxes are placed in one or more blades that can be filled by liquid, gas, fluid, mixture, powder, gel-material, sand, compound, or solid. In one embodiment, the pumping station is at the ground level, or in the tower, or in the blade, or near the generator (with the source of material on any of those locations).

In one embodiment, the liquid is water or a mixture of water with other substances (such as anti-freeze, for winter operation). In another embodiment, other liquids can be used. This can be used for regulation of speed, building angular momentum for level and uniform speed of rotation, change blade mass based on weather condition, to optimize performance and efficiency, and selectively make one blade heavier during storm or maintenance, for insuring it does not move for that period, for safety reasons.

In one embodiment, the liquid is pumped in or out of the cavities, based on seasons or wind speed or weather conditions or blade speed, to optimize the electricity generation, or to secure the generator against high speed winds, by having a larger/variable mass in the blades at different times of the day or season. This is useful for producing dynamically variable blades, for efficiency of electrical generation optimization and stability of blades during storm, as an example.

The weather parameters are pressure, wind speed, moisture, pressure gradient on different sides and locations, temperature, wind direction, swirl, spin, turbulence, or laminar flow, or rate of change of those with respect to time or distance, as first derivative, or rate of change of rate of change, as the second derivative, with respect to time or distance or combination of those two.

We can predict from weather forecast or on real-time, feedback from the sensors, on the tower, blades, or ground, or remote station, or central command station, or extrapolate/ interpolate the old data, for prediction, to adjust the parameters for the blade, generator, shaft, angles, masses, gears, number of units operational in the farm, pitch, length, height, gearbox, or all other parameters mentioned in this disclosure, for optimization, as detailed in this disclosure.

In one example, the blades have multiple chambers or empty containers at different locations inside blade for liquid, gas, solid, powder, sand, or combination, to pump in/out, or use gravity during rotation, to shift the center of mass or shift the weight or change the mass of the blades or more the mass toward the tip or center of the blade, symmetrically for all blades, or unsymmetrically, e.g. with hot water, or ambient temperature, or cold water, partially or fully, making the chambers full or empty, for all or some of the chambers, at different time of the day/season/weather conditions, to optimize performance.

Or, this can be for stability for maintenance, to hold the rotor stationary at a given position, e.g. changing the center of mass toward the lower blade, for fixed position during maintenance and safety of the crews, so that the blade does not swing anymore.

Figure 20:
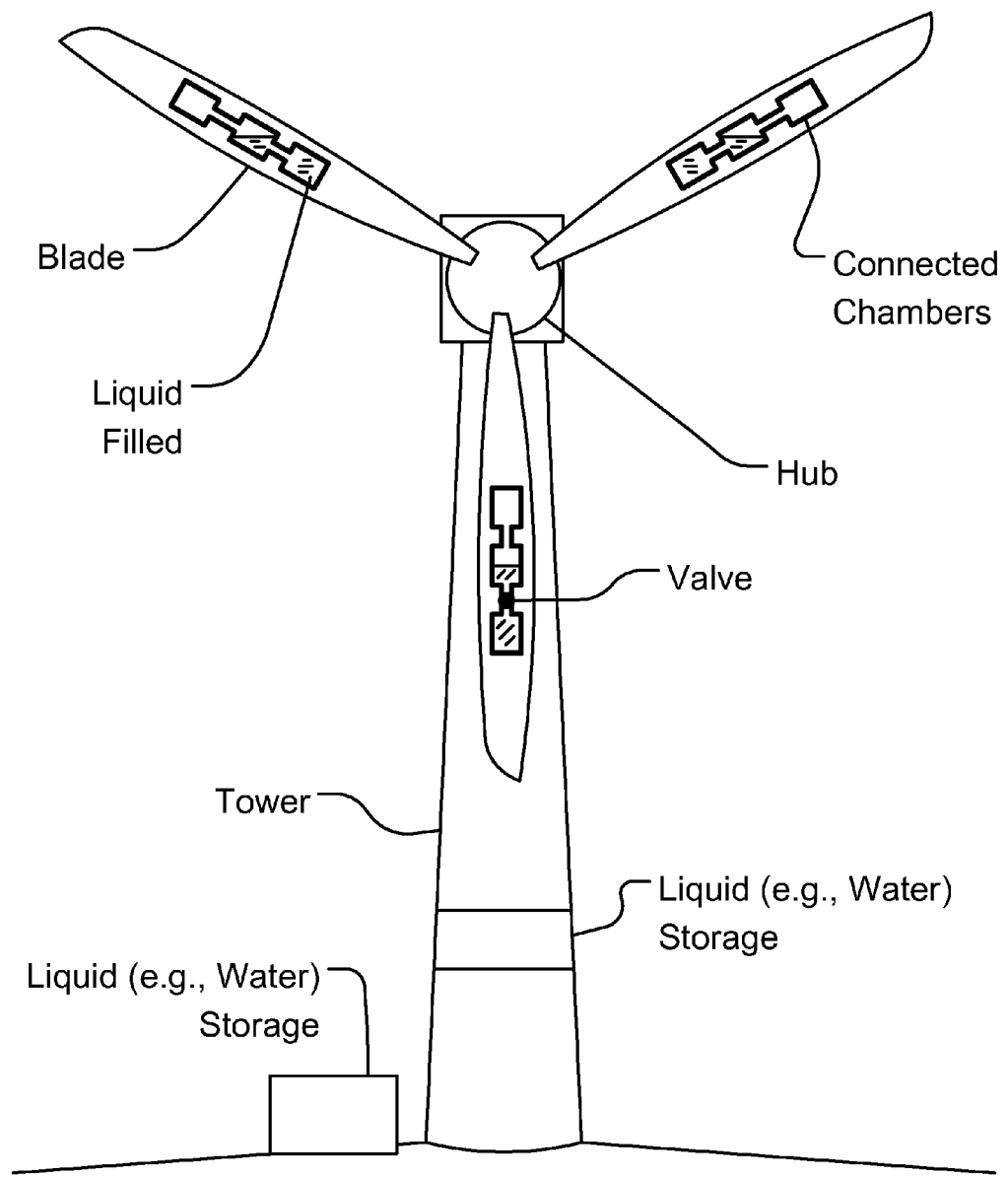
FIG. 20 shows one embodiment of this invention, for compartments for liquid and solid or gas in the blade, as storage or mass shifting.

The multiple chambers may have valve, seal, or connection/pipes in between, to stop or let the liquid, solid, or fluid move around between the chambers, as in FIG. 20, in a blade, or between blades, using pump, centrifugal force, during rotation, or gravity, changing and shifting mass or center of mass in a blade/blades, for changing angular momentum or linear momentum, for optimization. This can also act as the conservation of momentum for storing energy during the high wind or storm with higher mass, and keeping that momentum for a while, during the low speed of wind, for continuous and more uniform operations/smooth rotations, which means higher efficiency for electricity and longer lifetime for components/lower maintenance/less expenses. This acts as a mechanical "battery" or energy storage.

Figure 25:
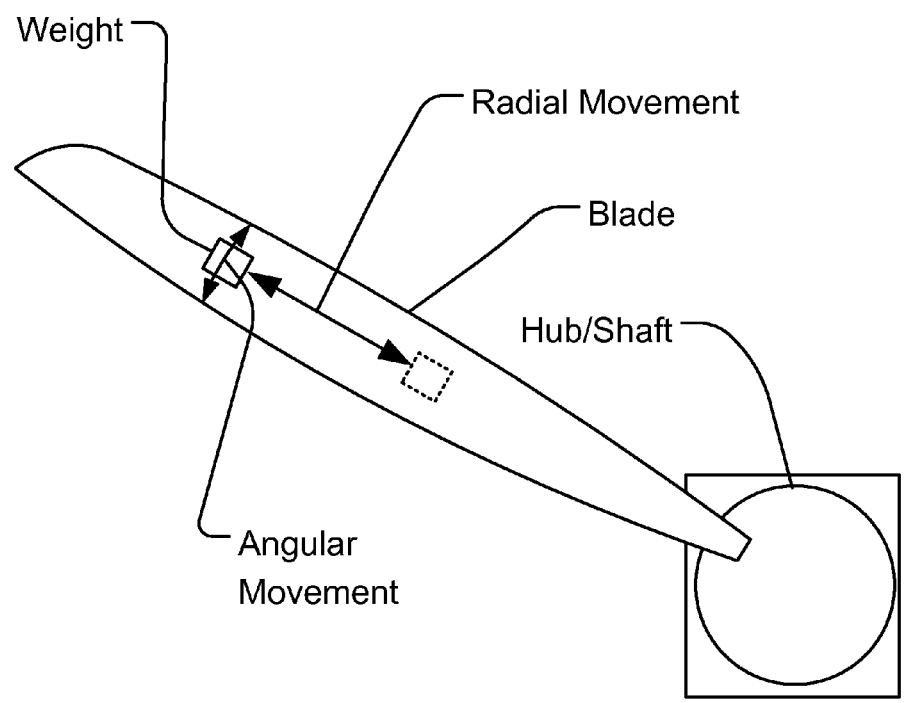
FIG. 25 shows one embodiment of this invention, for weights moving in angular or radial directions, in the blades or wings or wind catchers.

The concept of variable or moveable mass for a blade or blades can be done using small weights in the hollow blade, moved on/by a rail, cable, rod, chain, or other mechanical methods, on a fixed or adjustable/flexible path or route, to shift or move radially or angularly, as in FIG. 25, with respect to the shaft, to change the mass, momentum, or center of mass, as described in this disclosure, to optimize the electrical production, or adjust for different weather conditions or wind speeds/directions, using the controller and weather sensors explained in this disclosure.

The momentum and center of mass can also be changed through extension of the blades, on the length or on the side, by opening layers or folding them together, similar to the airplane wing, for bigger or smaller cross section on the angular or radial directions.

Figure 9:
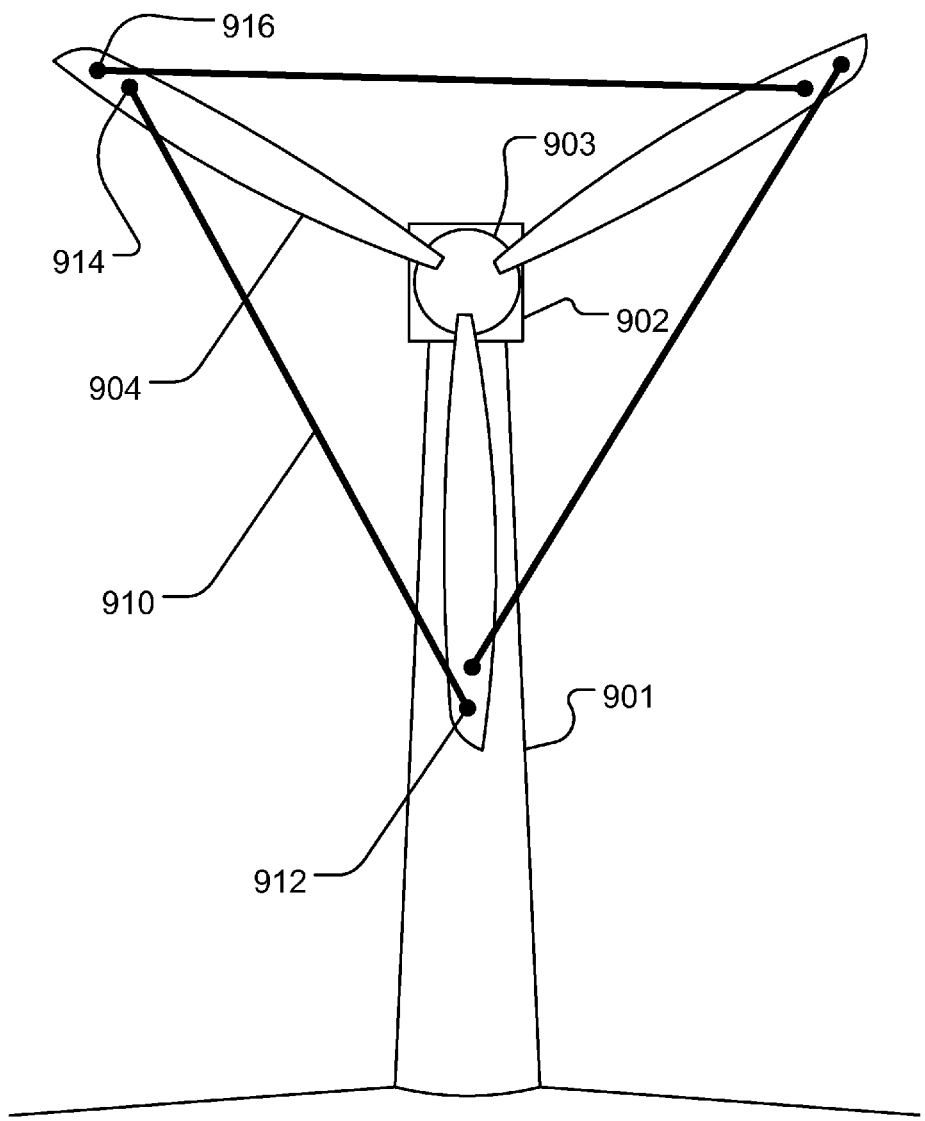
FIG. 9 shows one embodiment of this invention, for tension cables for blades.

An embodiment adds stability to the blades by connecting them mid-way by tension cables or solid connectors (e.g., FIG. 9).

Figure 11:
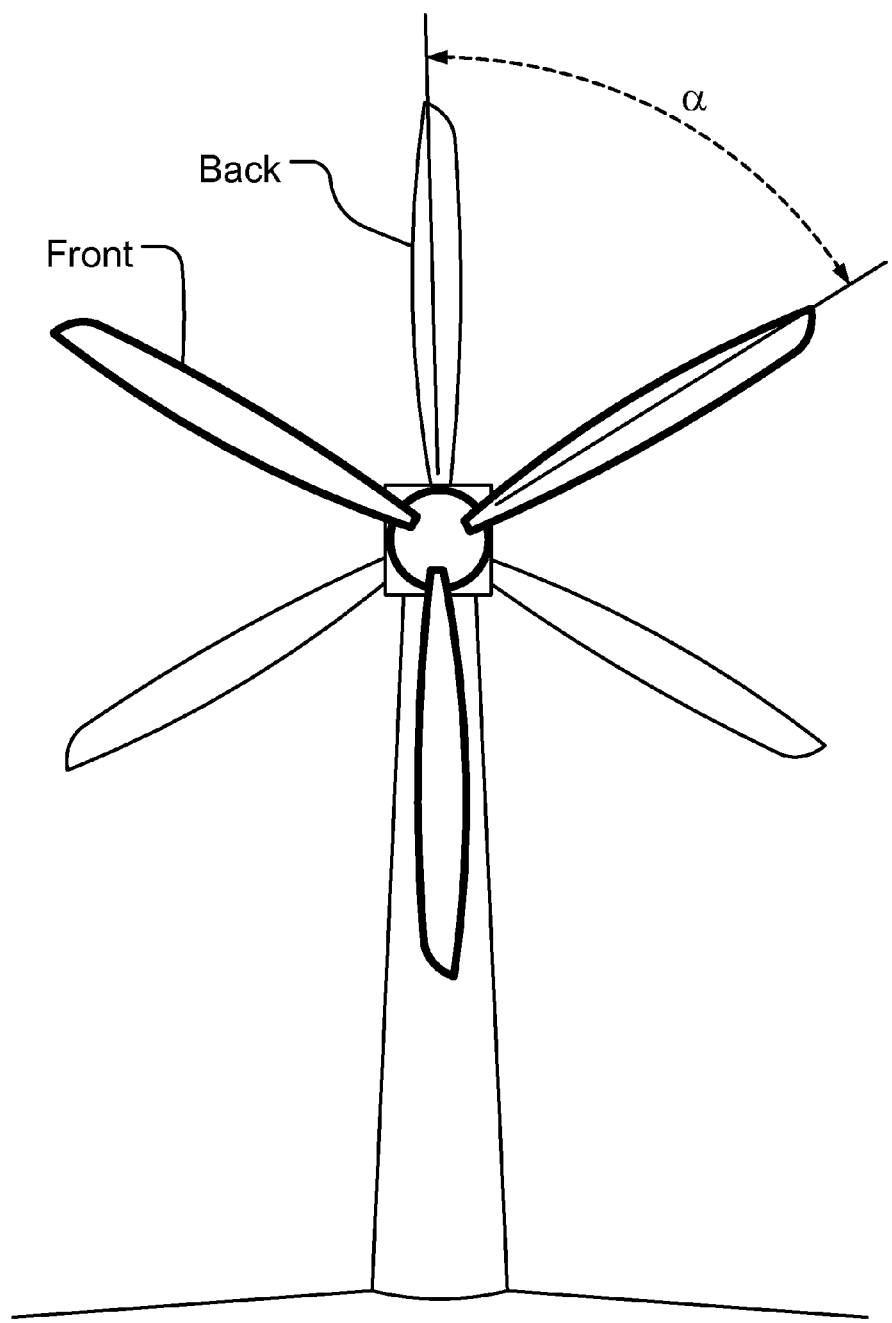
FIG. 11 shows one embodiment of this invention, for multiple sets of blades.

Multiple Blade Sets on the Tower:

As in FIG. 11, we have one blade set at upwind and another at downwind, positioned so that the two sets are shifted angularly, and rotating in synch with each other. An embodiment converts more wind energy to electrical energy, compared with a single blade set. In one embodiment, double set of blades provide more balance and get more energy out per tower.

One embodiment (FIG. 12A) uses two different axes for two blade sets. One embodiment use the same axis for the blade sets (FIG. 12B).

One embodiment (e.g., FIG. 13) uses gear box to transfer the mechanical energy from both blade sets to single 1301 axis for generating power.

Figure 14:
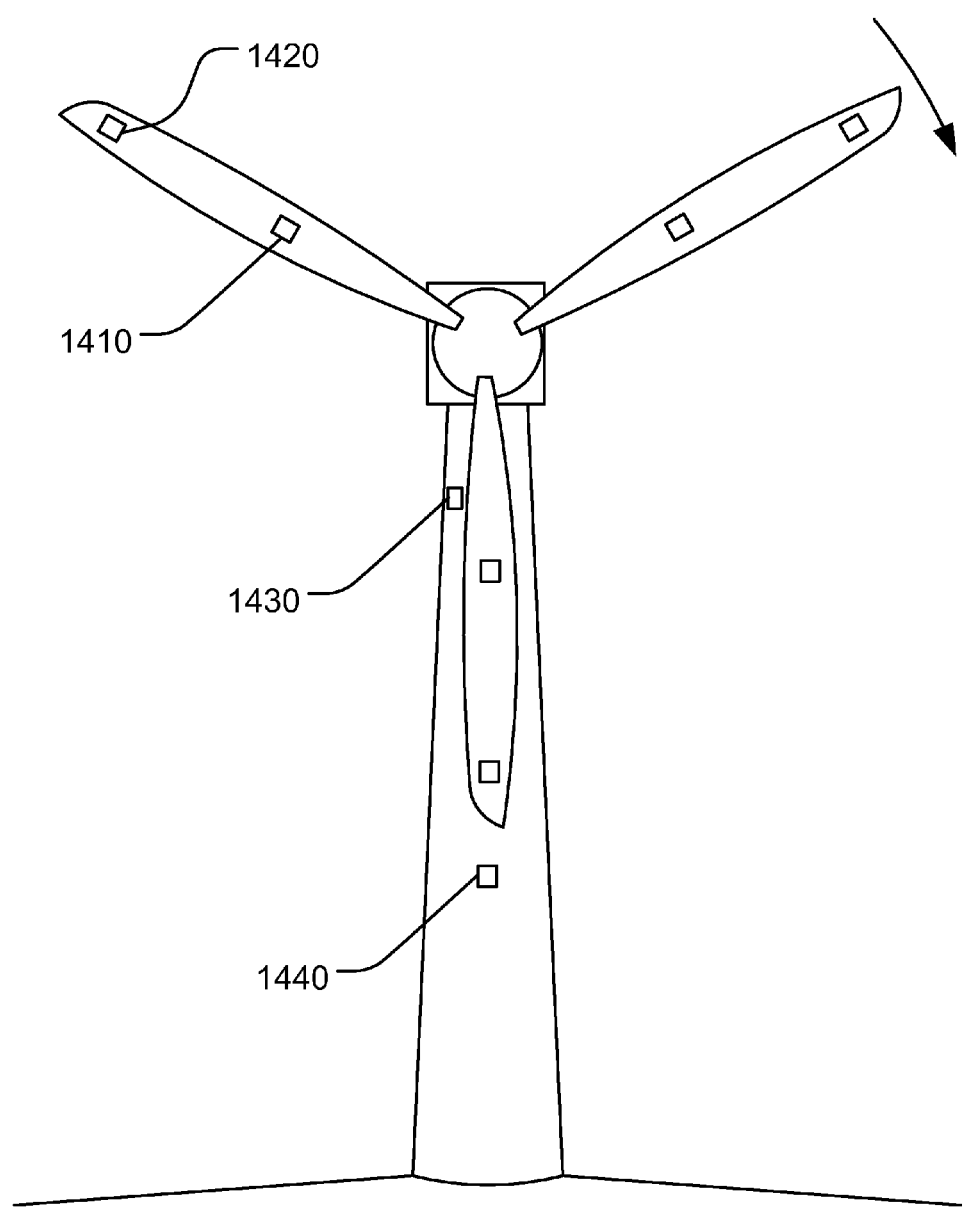
FIG. 14 shows one embodiment of this invention, for sound/light making devices.

Other Features:

Sound emitting devices on the tower or blades (with or without light sources, flashing or non-flashing) are used to repel birds or insects (e.g., as shown in FIG. 14).

Figure 15:
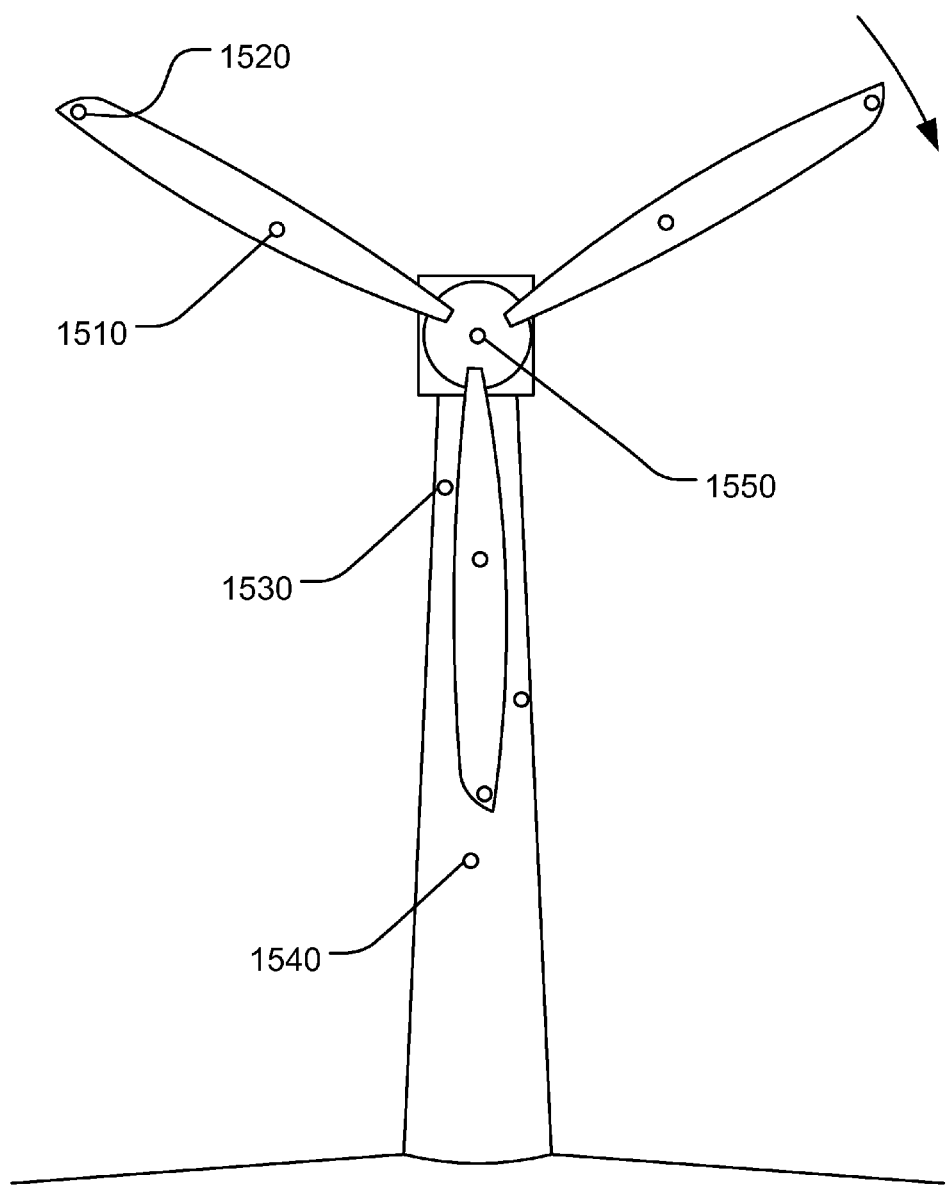
FIG. 15 shows one embodiment of this invention, for sound/light making devices.

Lights at the tip and/or side of the wind mill blades or tower are used for night time, to alarm the airplanes and helicopters, in one embodiment (e.g., FIG. 15).

In one embodiment, to rotate the blades during the construction, water or other liquid is pumped into containers inside cavities or attached to blade pieces to help rotate the blade pieces around to attach next blade piece. This can be temporary or permanent, in different embodiments.

Figure 22:
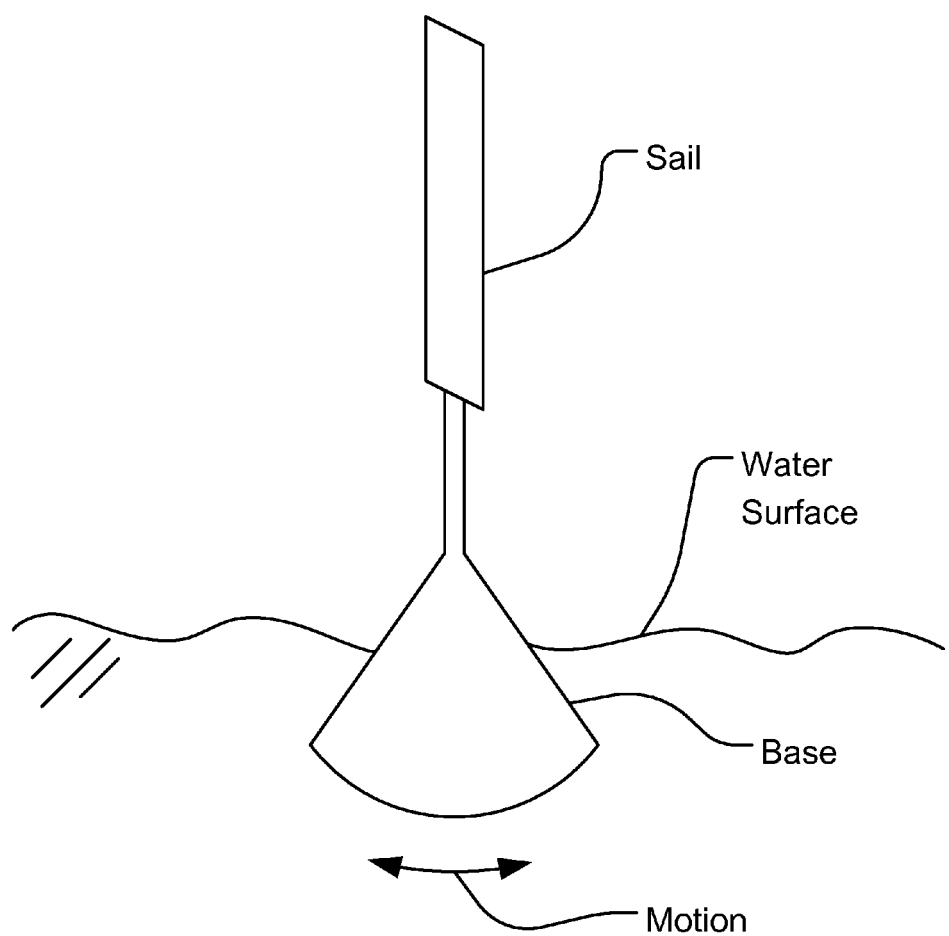
FIG. 22 shows one embodiment of this invention, for pendulum in the sea, or due to the wind on the ground, with a sail structure, to store energy, or transfer that to electricity, with a generator.
Figure 23:
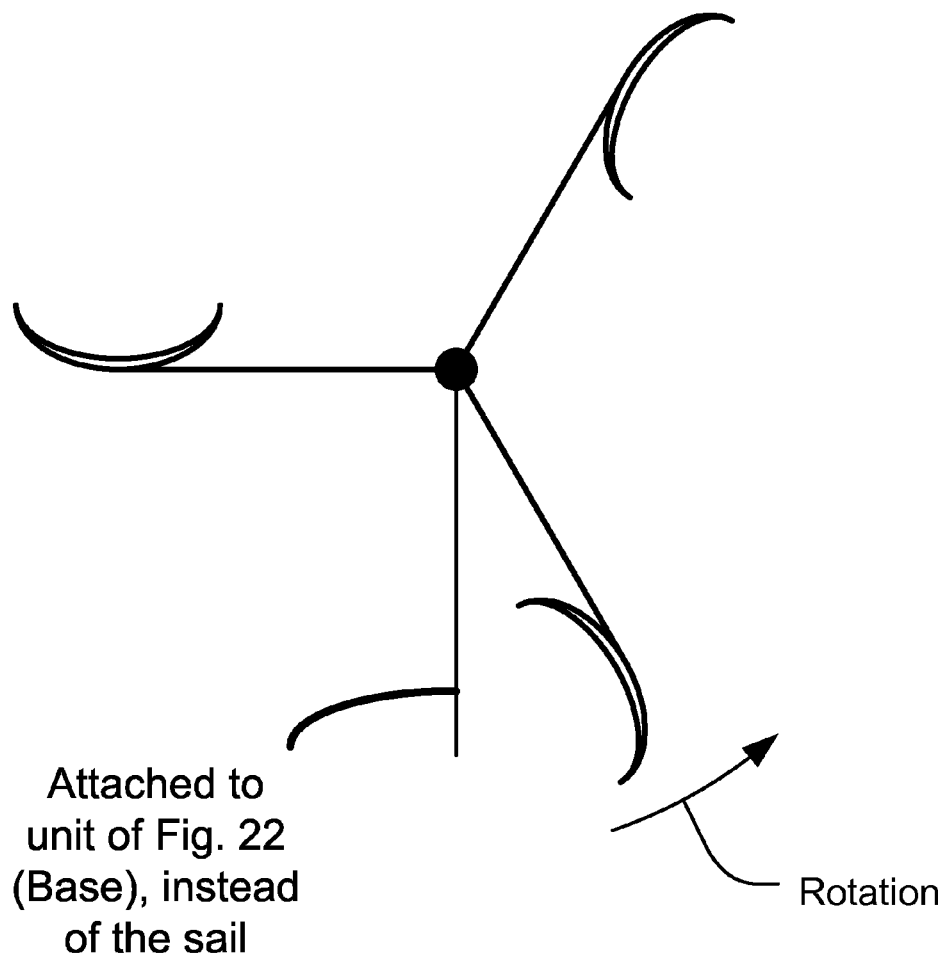
FIG. 23 shows one embodiment of this invention, for catching the air, attached to the unit of FIG. 22, instead of, or in addition to, the sail.

In one embodiment, for example for towers placed on/inside water or ocean, the mechanical energy is obtained from the wind fluctuations and/or water fluctuations, such as tide or waves or undercurrents, causing pendulum-like motion on the tower, e.g., as wind velocity varies, as in FIGS. 22-23. In one embodiment, the base of the tower is attached to heavy weight anchors used to support the tower, during the fluctuations. The liquid or weights at the bottom of pendulum-like structure or tower act to build angular momentum to swing the tower in the other direction, releasing mechanical energy, from stored energy, in the other direction. Attaching a generator and shaft to this assembly, one can generate electricity, by converting the pendulum motion of the tower (or base of tower or shaft) into electricity, using a generator assembly attached to it.

Figure 17:
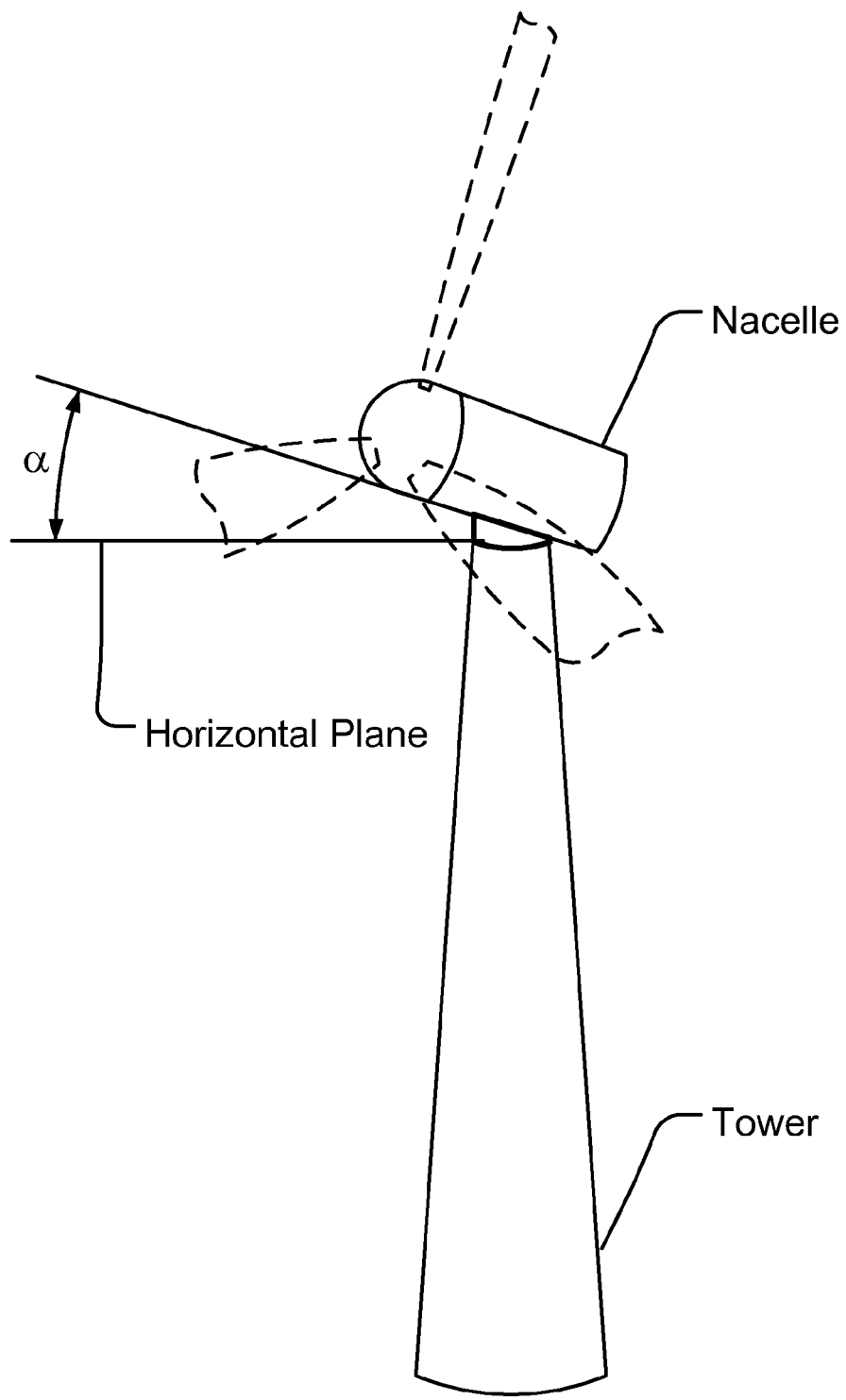
FIG. 17 shows one embodiment of this invention, for tilted assembly as a whole.
Figure 18:
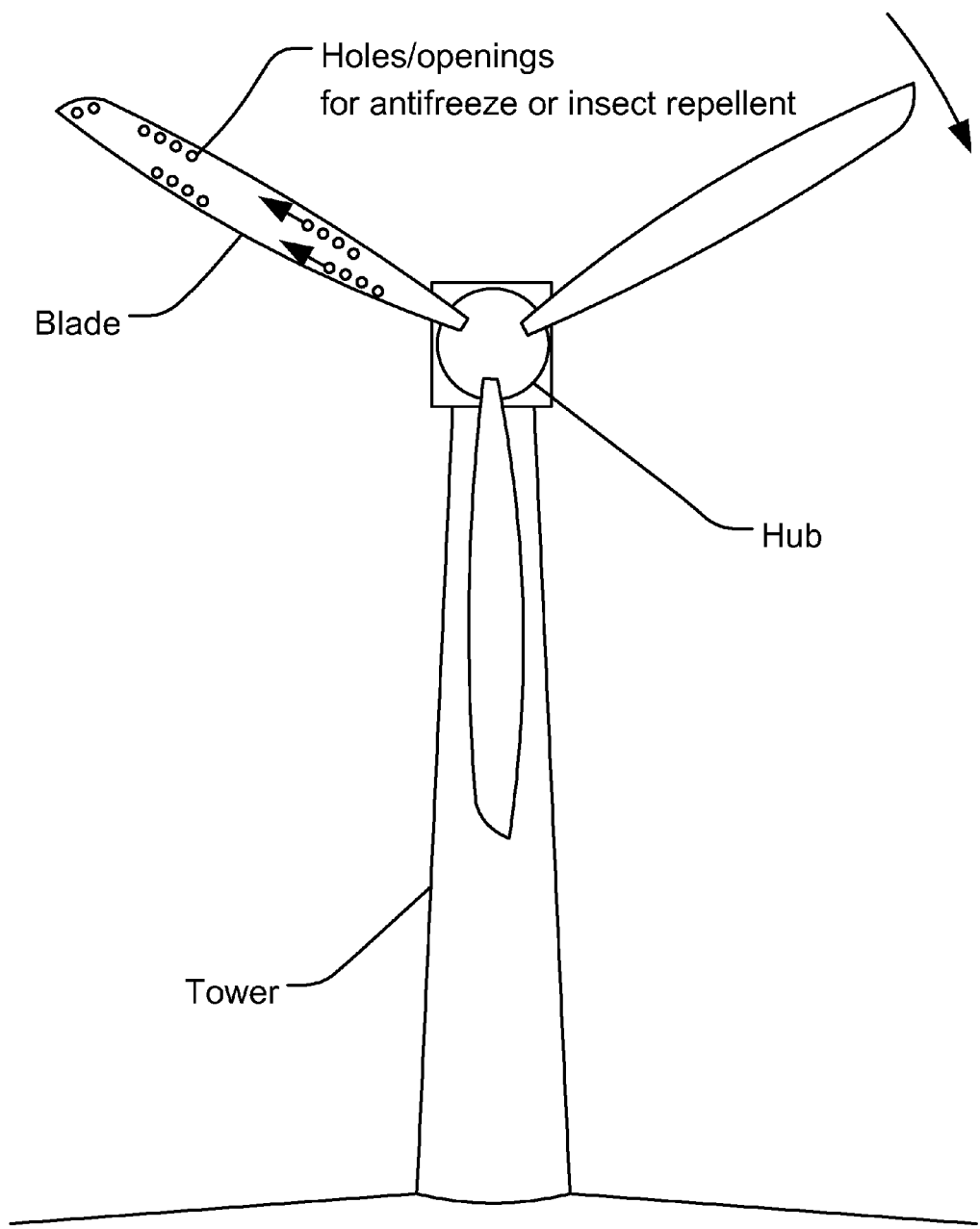
FIG. 18 shows one embodiment of this invention, for holes on a blade, for liquid or gas or air or small solid particles, for injecting them on the blade, or sucking them in, in reverse.
Figure 19:
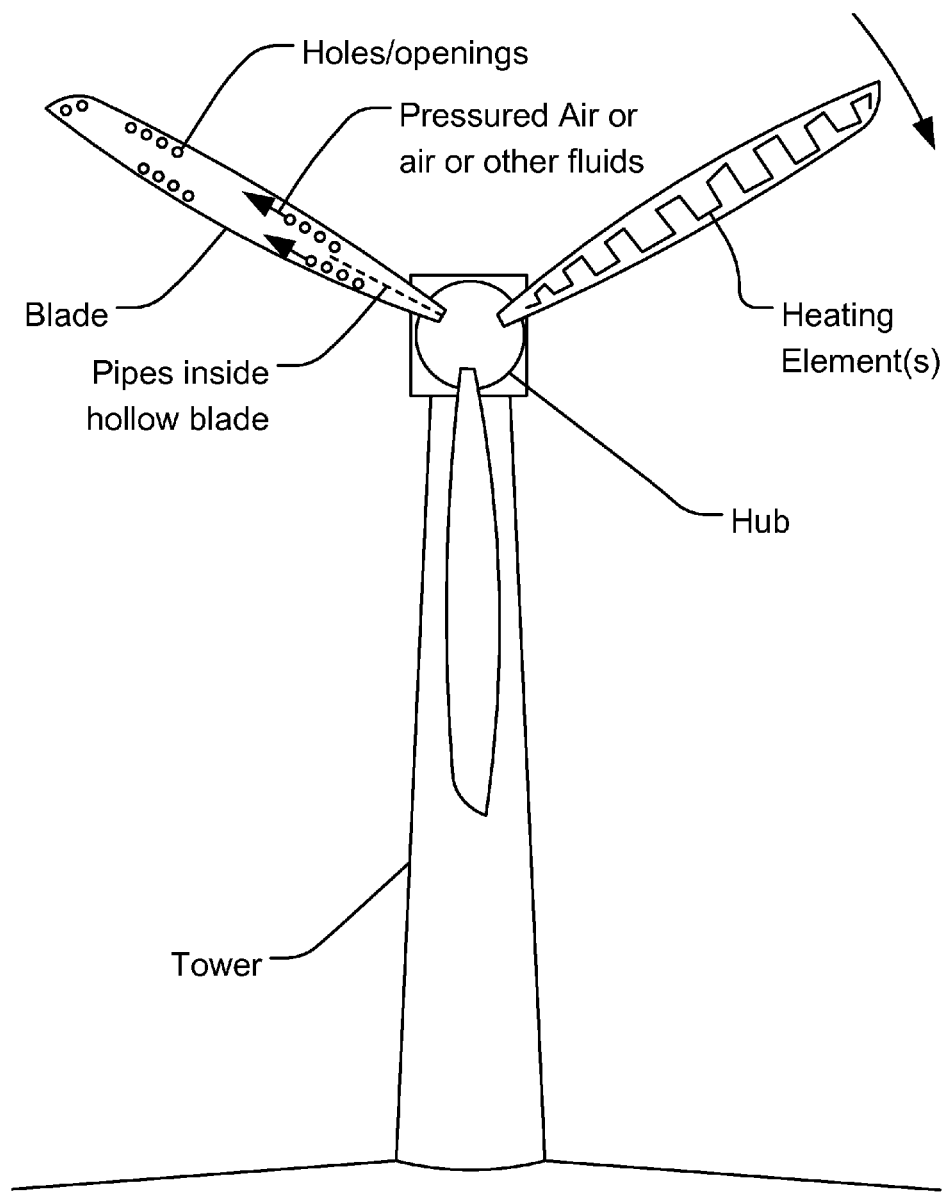
FIG. 19 shows one embodiment of this invention, for heater elements on the blade, and holes/pipes for pressurized gas or liquid, in the hollow blade, or integrated in blade.
Figure 26:
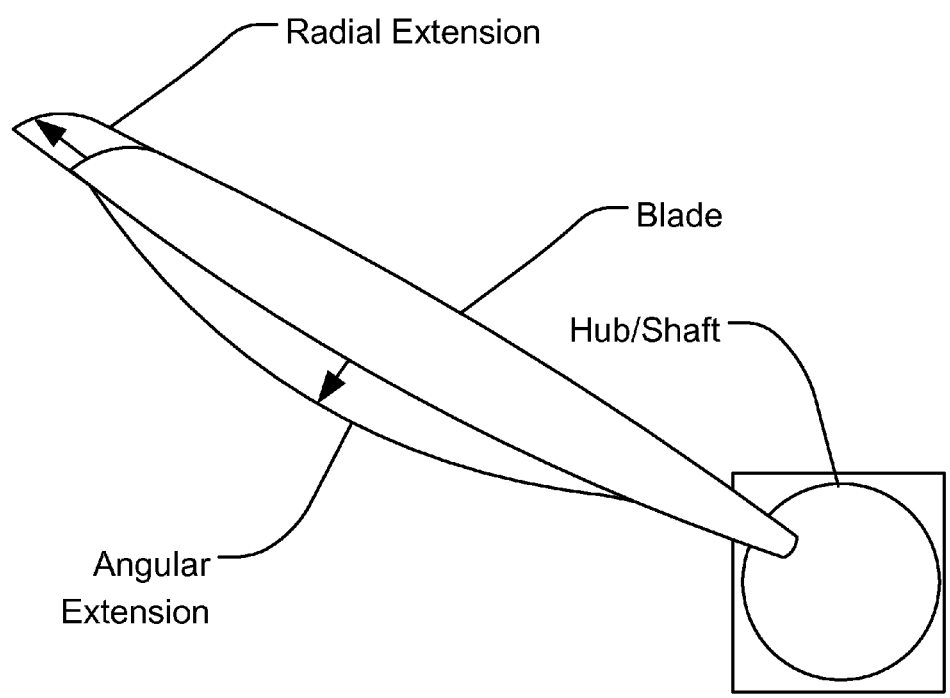
FIG. 26 shows one embodiment of this invention, for extending the blades, from other layers hiding behind, in angular or radial directions.
Figure 27:
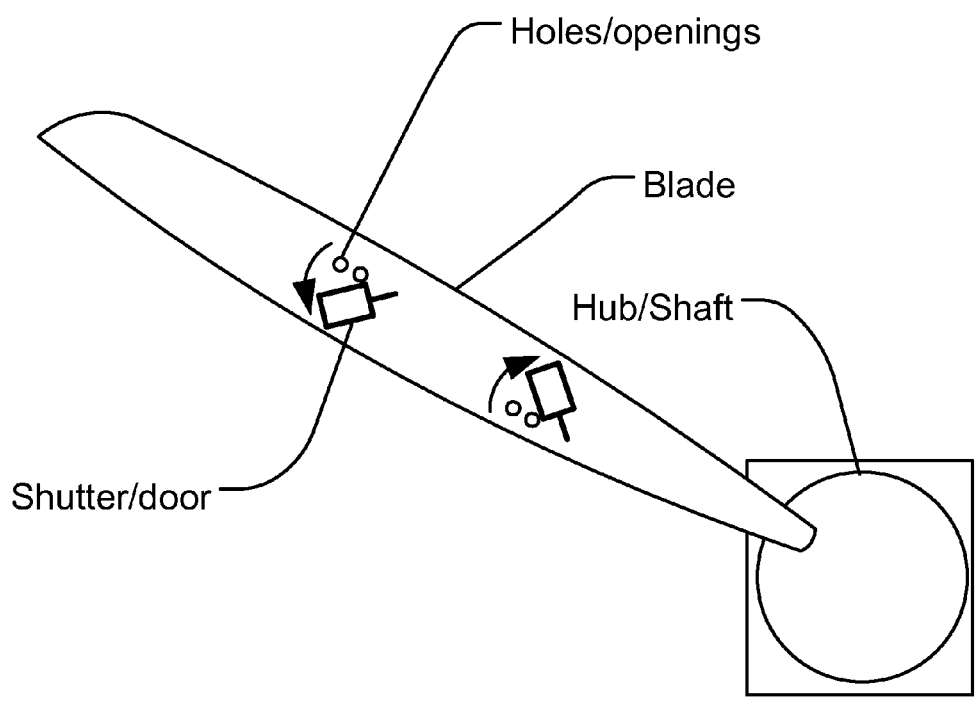
FIG. 27 shows one embodiment of this invention, for covering the holes with shutters or hinged caps/doors.
Figure 28:
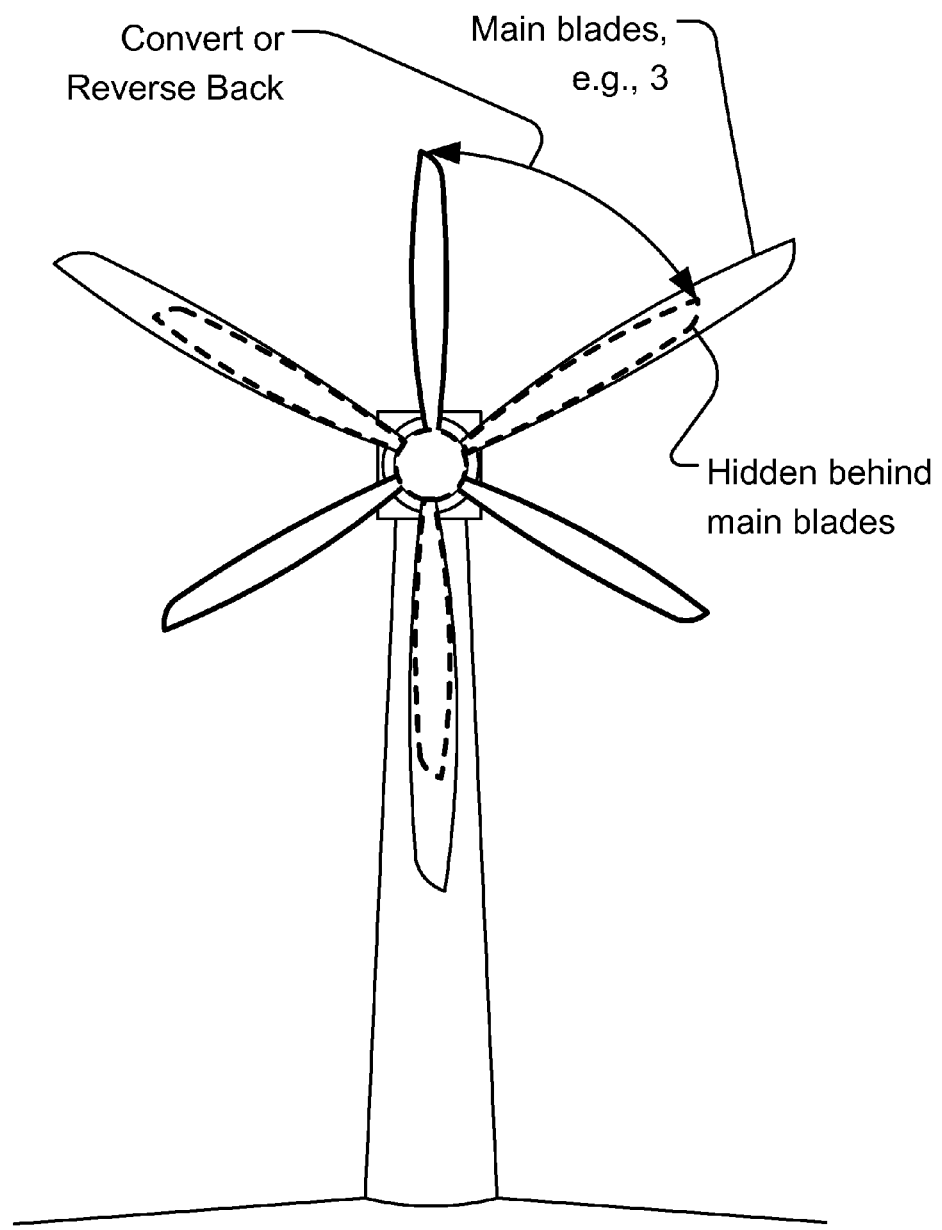
FIG. 28 shows one embodiment of this invention, for extending the blades, from other layers hiding behind, as new extra blades, adding to the number of blades.

For the other multiple embodiments, we can have one or multiple rotors on a same tower, with one or more of the following features/options/choices, as mentioned below in the list, as alternatives, or in combinations, to optimize electrical generation/performance/efficiency and/or increase stability/lifetime of the components:

with different or same blade or shaft sizes.
at the same or different heights.
opposite (180 degrees) or at different angle to each other.
on the same or different shafts or generators.
connected or not-connected internally, e.g. with gear(s) or through gearbox(es).
unsymmetric or symmetric shapes, for blades.
multiple or single rotor on a shaft.
unsymmetric or symmetric angles, for blades, with respect to the shaft or center.
with smaller blades in between the larger blades on the same shaft or rotor, for different wind speeds optimization/operations.
different or same pitches for all or some blades.
with blades, staggered, parallel, or in series, with respect to the angle, with respect to the axis or center or shaft.
with coaxial, angled, shifted, or parallel, for different shafts.
with blades, aligned or not-aligned, with respect to each other.
with blades with same or opposite or different pitches, with respect to each other.
with blades with same or opposite or different curvatures, with respect to each other.
rotating rotor, shaft, nacelle, or whole assembly, in an angle, with respect to the horizontal plane, as in FIG. 17.
rotating rotor, shaft, nacelle, or whole assembly, in an angle, with respect to the vertical plane.
the blade having multiple holes for antifreeze or insect repellent or bird repellent (e.g. liquid or spray or smell), as in FIG. 18, using the pipes to supply the material from tower, ground, or blade containers, e.g. through hollow blades, e.g. to remove dirt or snow or ice (de-ice), from the blade, or clean the blade, or use nozzles or pressured air or gas/jet/regular air or gas, or cleaning agents, to do the cleaning
having blades with the holes and nozzles/pipes, as mentioned above, with or without shutters, caps, doors, covers, hinges, rails, chains, valves, manifolds, or flaps, as in FIG. 27, to open, close, or adjust the rate of the flow of fluid or material flow volume per second, to the surface of the blade, as in FIG. 19, (or using suction and pump/compressor, air coming from the surface of the blade, in the reverse direction), with holes going through the blades in length, width, or thickness, connecting one or more parts of blade or surface of blade together, for pressure adjustment, equilibrium, or optimization, e.g. against/during the storm condition or compensate for the turbulence in the air around blade(s), or taking advantage of those situations, for optimization and continuous operations, rather than shutting down the operations or stopping the rotor/shaft/blades.
blades consisting of multiple flaps or layers, folding on top of each other, for bigger or smaller areas, as in FIG. 26, and also, in FIG. 28, or more or less holes openings for the air or fluid to flow back/forth, in/out, for adjustments and optimization of pressure around the blades. This can be full size or smaller blades hiding behind others, partially or fully, for a different weather condition, for optimization.
the blade having heating elements, as in FIG. 19, inside or on the surface, for the blade, or vibrators or ultrasonic sources, for de-icing, in the winter, or cleaning debris, for better operation, or less mass on the blades.

Figure 21:
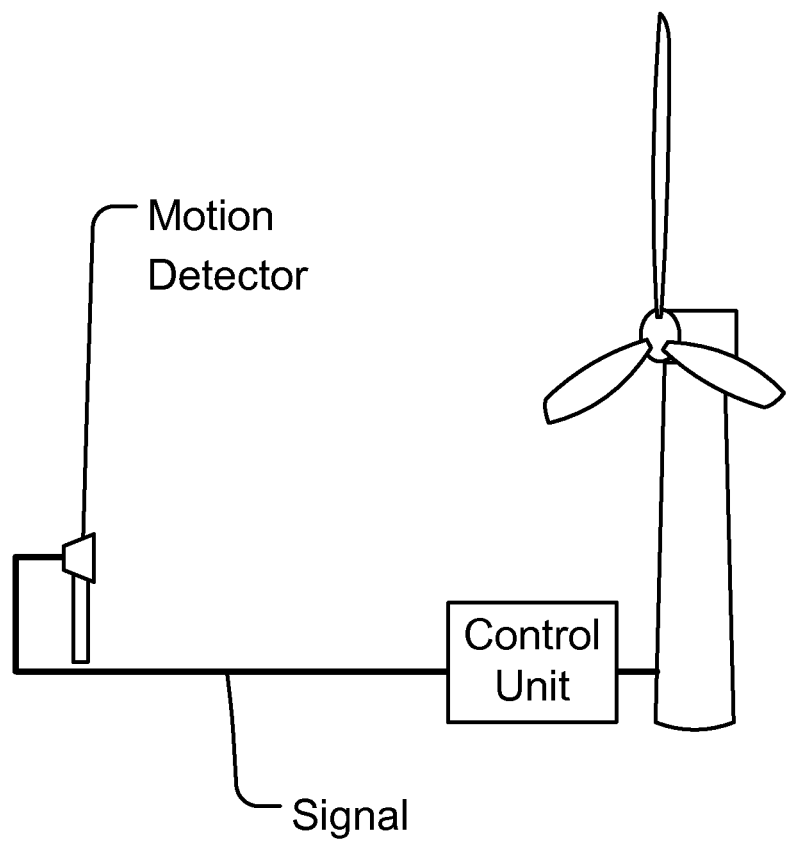
FIG. 21 shows one embodiment of this invention, for motion detector for controller for controlling the operation of the unit, e.g. stopping or slowing down or locking the unit or blades, for safety.

In one embodiment, we have a motion detector or heat sensor or recognition or pattern analyzer, near the blade or tower, or on tower, detecting kid, animal, or bird, to stop the blade or slow down, from rotation, for safety, as in FIG. 21.

This signal or information (or other signals and measurements taught in this disclosure) is connected to a controller or CPU or computer or central unit or processor, which sends commands to the tower, blade, shaft, or assembly, or other components of the unit or generator, to adjust parameters of the tower, blade, shaft, or assembly, or other components of the unit or generator, e.g. lock or stop the blade, gearbox, or shaft, or open or close any valve or adjust other parameters, as taught in this disclosure.

Figure 24:
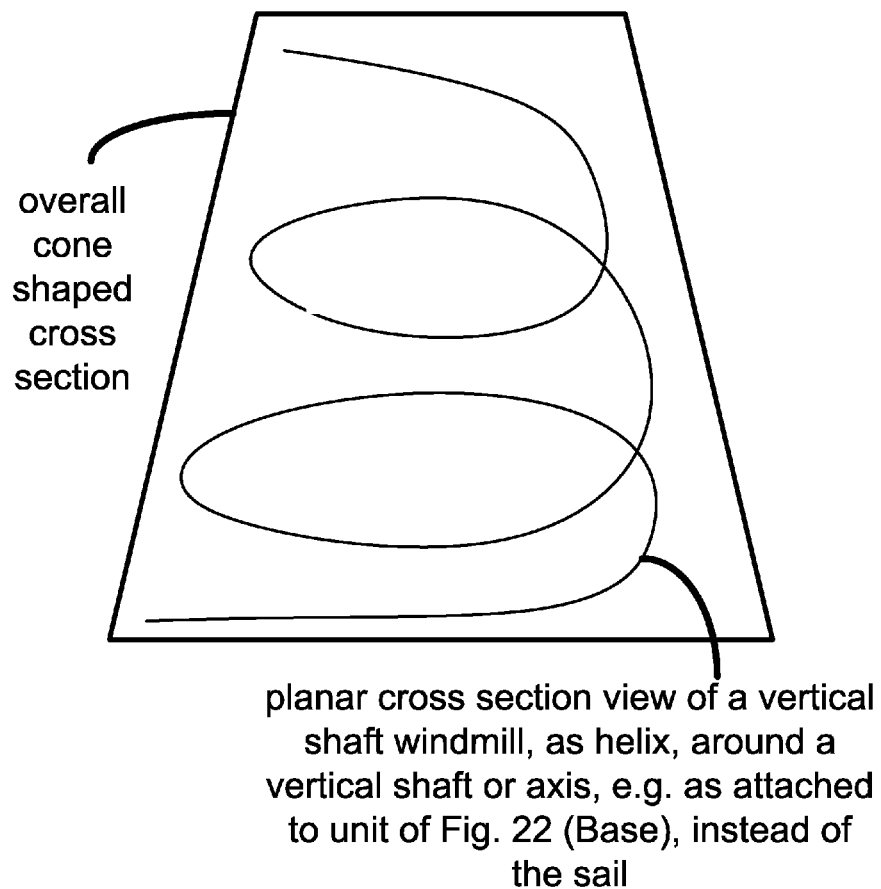
FIG. 24 shows one embodiment of this invention, for vertical shaft windmill, as helix.

In one embodiment, we have a helix, as in FIG. 24, for a wind mill with a horizontal plane of rotation, around a vertical shaft or axis. The shape of helix can be a cone, reverse cone, or cylinder, for cross section.

Figure 29:
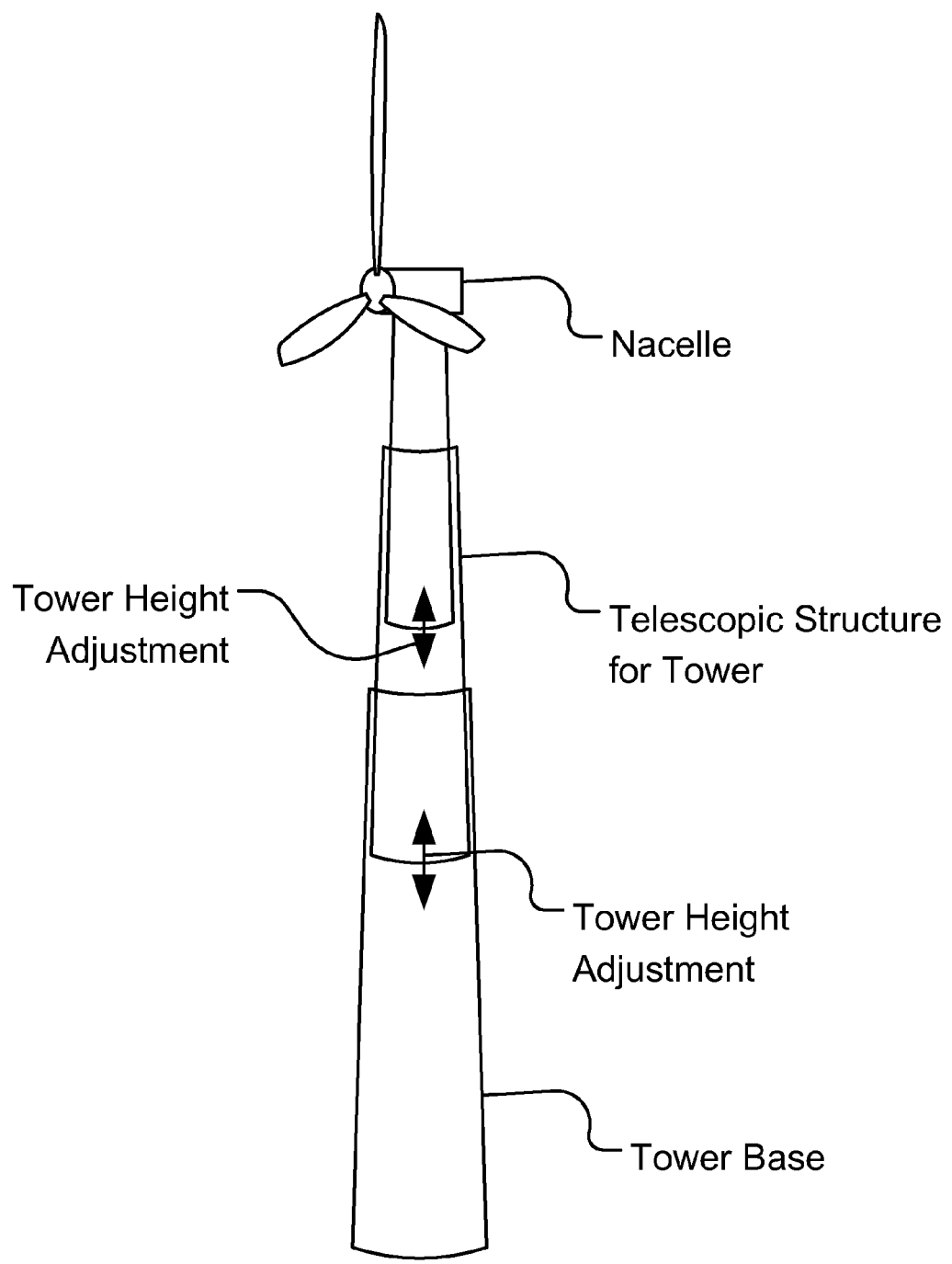
FIG. 29 shows one embodiment of this invention, for telescopic tower structure, to adjust the height, due to weather, for optimization, with lift or hydraulic mechanism, for catching high altitude or elevation winds, when needed, and also in reverse, in shorter height for/during storms or high winds.

In one embodiment, we have a telescopic structure for the tower, as in FIG. 29, or shaft for the blades, to change height of tower or length of shaft for different weather conditions, for optimization. This can be done by lift, motor, chain, rail, elevator system, hydraulic, or jack system.

In one embodiment, we have a wheel, rail, or carousel system under the tower, for small towers to rotate or move them, manually or by motors/automatically, to store them, or repair them, or rotate them, for optimum performance, for electrical efficiency, depending on the feedback and weather, or electrical demand, or storage/battery capacity remaining, or unit of electricity cost at that time of the day/economic reasons, by the controller system.

Figure 16:
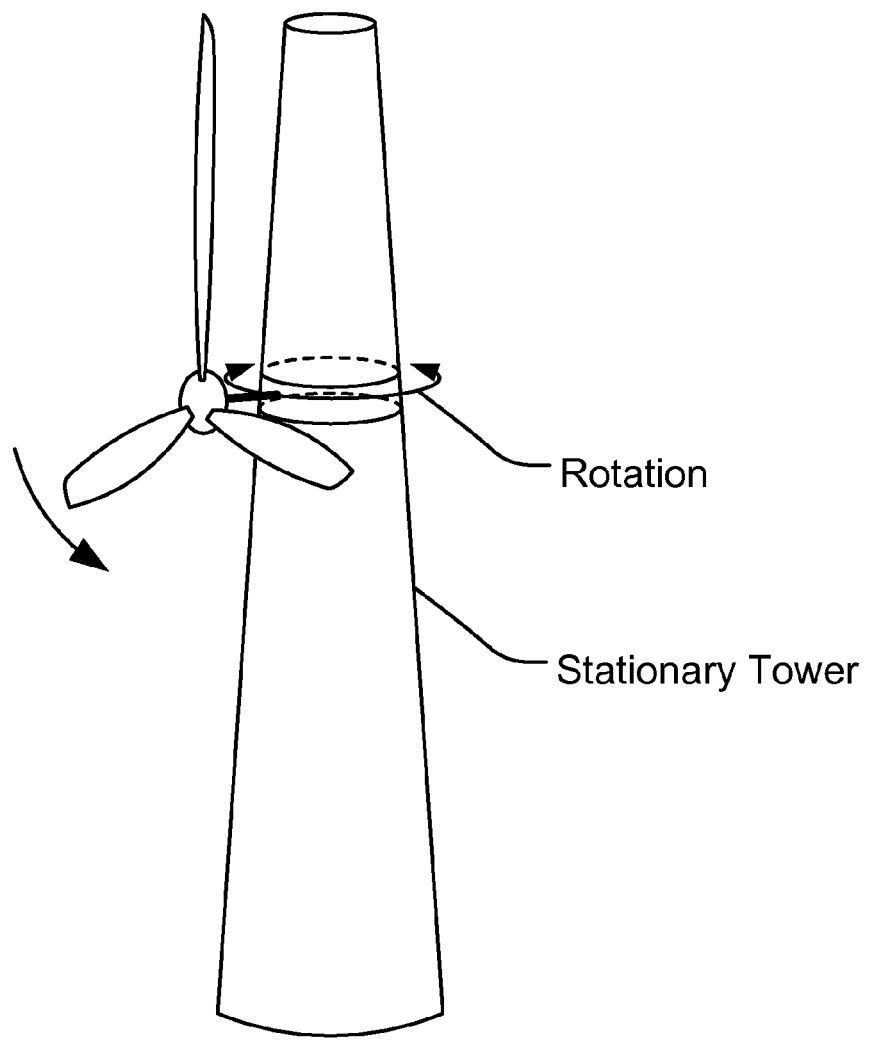
FIG. 16 shows one embodiment of this invention, for rotating rotor, with respect to the tower.

In one embodiment, the rotation of the rotor can also be done using only the top of the tower, as a separate unit, and rotatable, which rotates with respect to the rest of the tower, as in FIG. 16, using motor or step-motor, e.g. using a rail or circular cylinders or wheels sliding on the rail, e.g. similar to the conventional train rail system, in a circle or curved manner, or the ball-bearings system.

Figure 30:
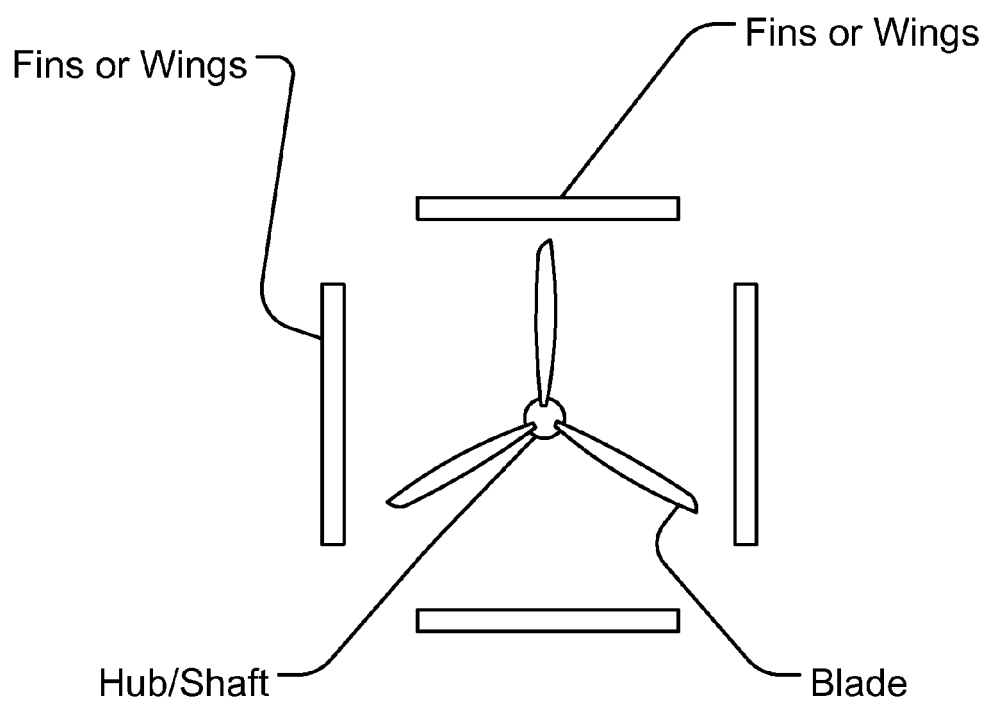
FIG. 30 shows one embodiment of this invention, for wings or fins for adjusting toward the direction of wind, for higher efficiency.

In one embodiment, we have fins or wings, as in FIG. 30, that adjust automatically for the direction of the wind, to make the rotor optimized for the direction of the wind, for efficiency, by rotating the whole assembly, similar to a sail of the sailboat, rotating or tilting the boat in the sea.

Figure 31:
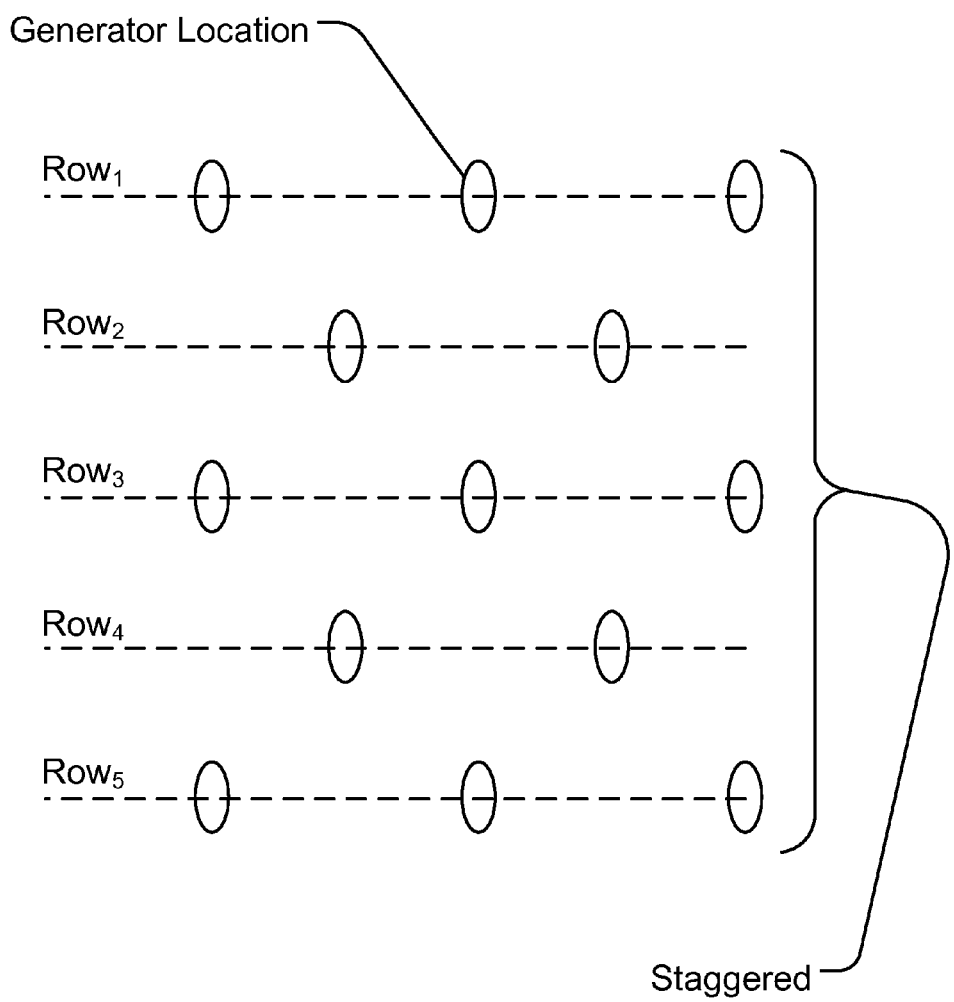
FIG. 31 shows one embodiment of this invention, for rows and columns of the matrix of towers, from satellite/top view, on the flat ground or sea, for relative tower positions, with coordinates in 2-dimensional space, X-Y coordinates, as staggered positions, in this example.
Figure 32:
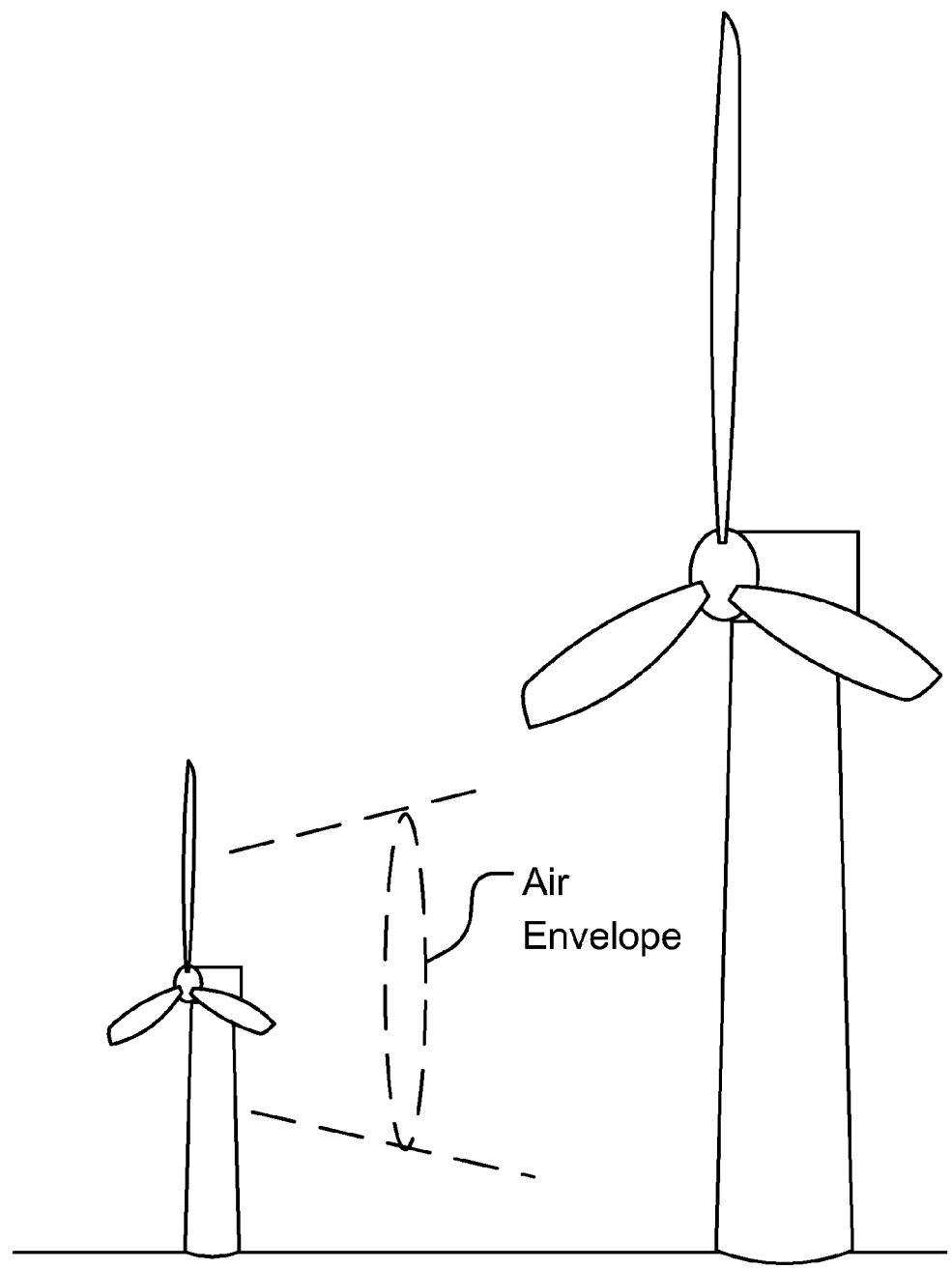
FIG. 32 shows one embodiment of this invention, for towers at different heights for higher efficiency, and lowering interferences or turbulence between two towers, and less overlap between the 3-dimensional cones of air disturbances behind each tower.

In a wind farm, we can adjust the distance between the units, for location of towers or generators, to reduce the interference between them, to increase efficiency of the whole farm as a whole, by staggering the rows or columns of the matrix of towers on the ground, as in FIG. 31. Or, we can use staggered heights for the towers, as in FIG. 32, e.g. every other tower in a row being short or small, then next one being big or tall, in the same row, or diagonally located.

FIG. 9 shows the tension cables or bars 910, which can be solid, rigid, flexible, or elastic, for safety, and extra stability, lifetime, strength, and integrity of the blades and whole system in high winds. It is connected at points 912, 914, or 916, by screw, bolt, or similar mechanism.

Figure 10:
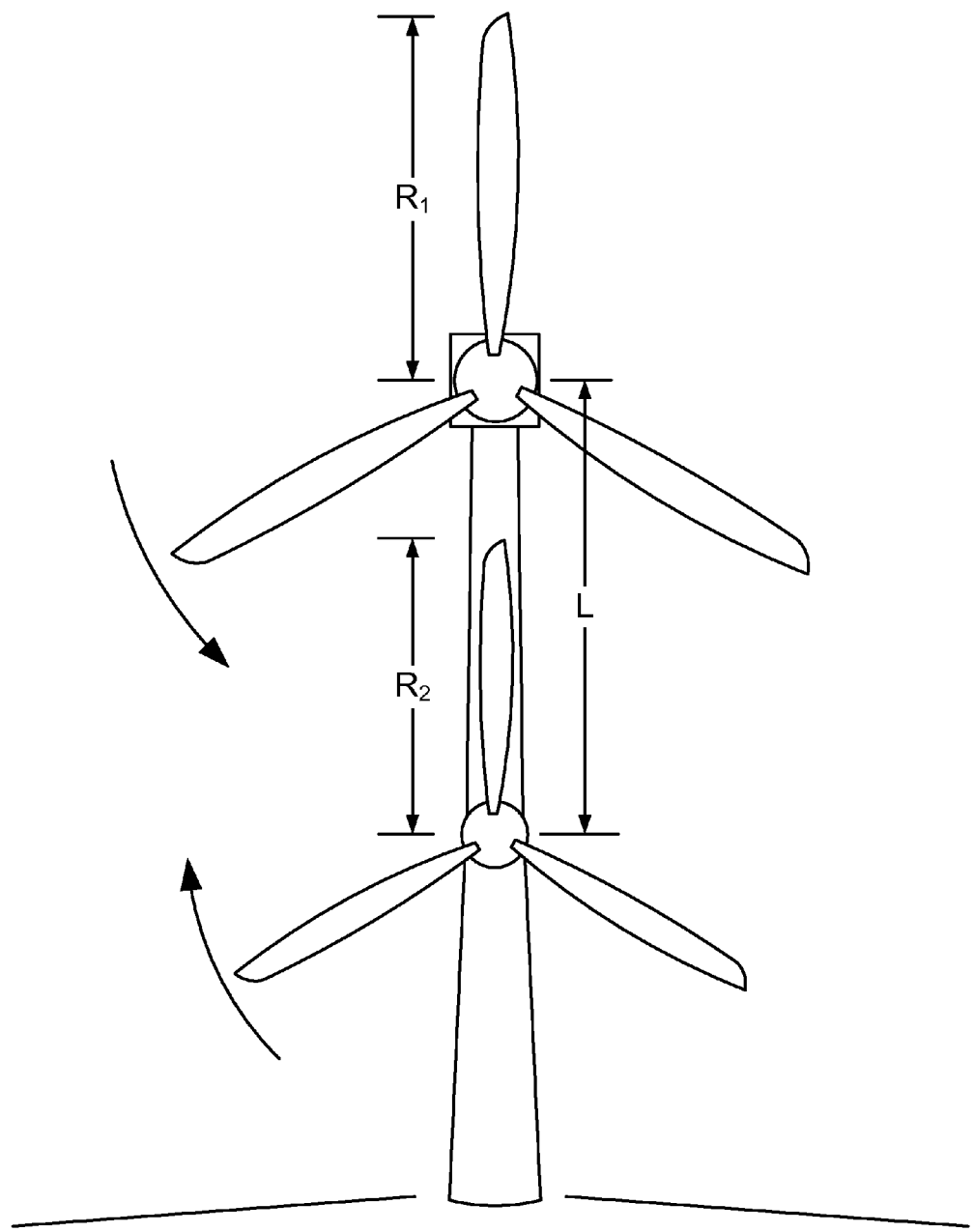
FIG. 10 shows one embodiment of this invention, for multiple rotors.

FIG. 10 shows multiple set of rotors on the same tower, at different heights, with rotation in phase or out-of-phase, or in opposite directions, with distance between the 2 shafts as L, compared to the lengths of 2 blades, R1 and R2, we will have the following cases, as an example: (L>R1 and L>R2, for the cases below)

a) with L<R1+R2 (with overlap)
b) with L>R1+R2 (with no physical overlap, but still interference on each other)

FIG. 11 shows front and back sets of blades, with angle α out of phase, in their angular positions with respect to each other, for optimization of/more energy generation, more stability, and more balance, with N blades on each side, e.g. N=3. The angular deviation between front and back side sets of blades is:

$$\alpha = (2\pi)/(2N) = \pi/N$$

Figure 12A:
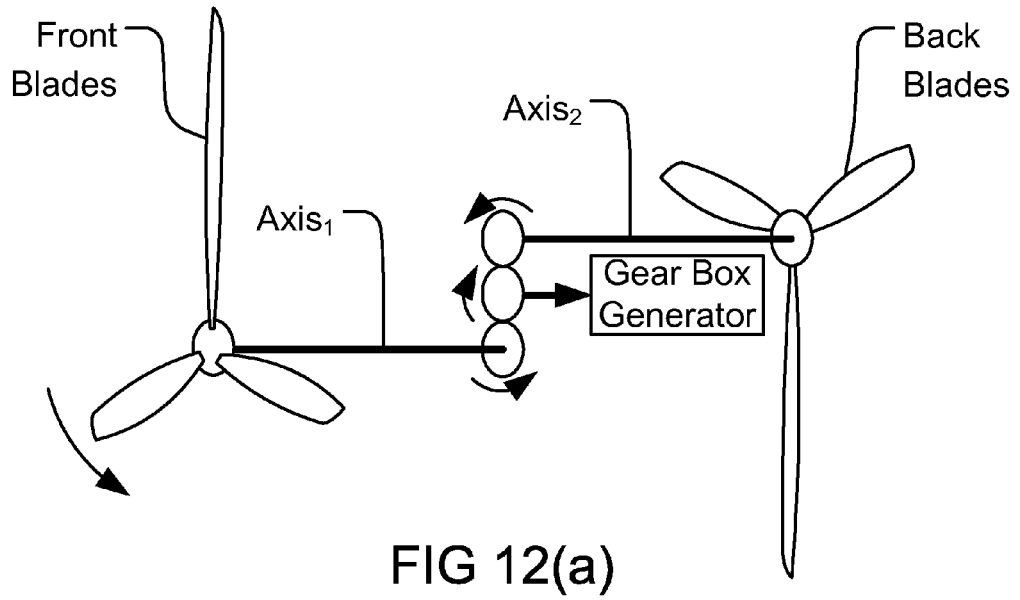
FIG. 12a-b shows one embodiment of this invention, for multiple sets of blades.
Figure 12B:
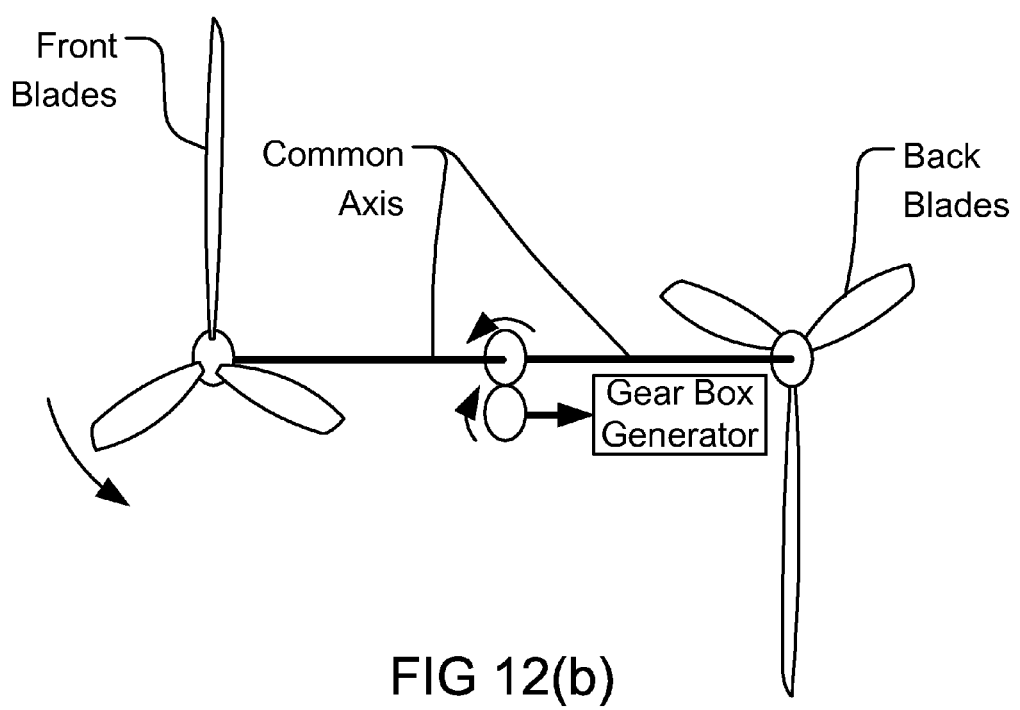

FIG. 12a shows two rotors connected through different shafts and gears, but going to the same gear box and generator. FIG. 12b shows that the 2 shafts are aligned on the same gear.

Figure 13:
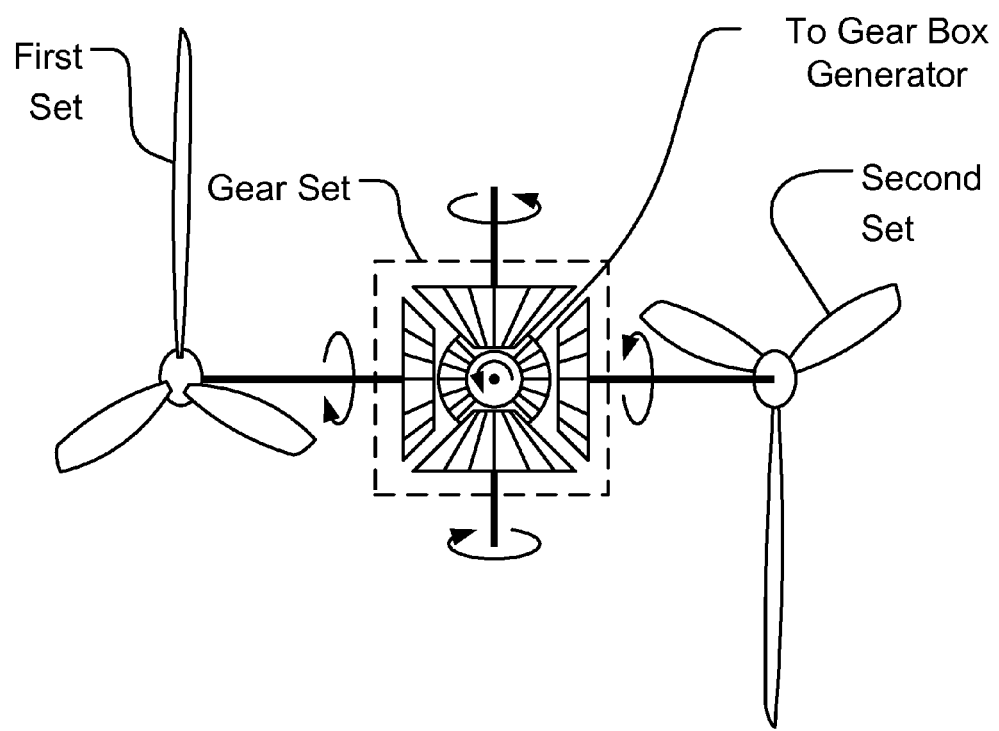
FIG. 13 shows one embodiment of this invention, for multiple sets of blades.

In FIG. 13, the 2 shafts are aligned on 2 horizontal gears, which in turn rotate 2 vertical gears, which in turn rotate a gear from gear box (connected/toward the generator) (the last gear is coming out of the page of the figure, toward the viewer's face, horizontally). The vertical gears are optional, in that we can make the 3 horizontal gears closer to each other, to be able to transfer the movement/energy directly from the shafts into the last gear, i.e. the gear from gear box (connected/toward the generator). These are, thus, synchronized.

In FIG. 14, we have sound or light making devices, which repel birds or insects, e.g. powered by windmill, or solar power panels on the tower. Or, it can also warn people or airplanes, e.g. as a radar-specific-reflection surface or laser-reflection surface, for receiving laser or radar signals from remote places, or for transmitting/sending laser toward airplane, or sending other electromagnetic radiations toward the radar stations, as a signature for the tower, or for pattern recognition, so that military or weather radars/imaging devices do not confuse the towers as a tornado or enemy aircraft. (This is a major problem these days.)

Thus, the imaging or radar devices can subtract or eliminate/ignore this signal, as coming from a windmill tower. The signal can give the exact GPS location to the remote military or weather station, for verifications, and it can also be recorded for future database, for comparison and verifications. The signals can carry an encrypted signature or a specific pattern of 1's and 0's for pattern recognition or verification, for distinguishing a tower.

The sound can also come from the specific shape of blade cutting through the air, making a whistling sound. It can also come due to the grooves and holes on the blades during rotation, or from forced liquid coming out of those holes, as described in this disclosure. The sources of sound or light can be on all sides of tower and blades, at center or tips, as in FIG. 15, as an example.

Figure 33:
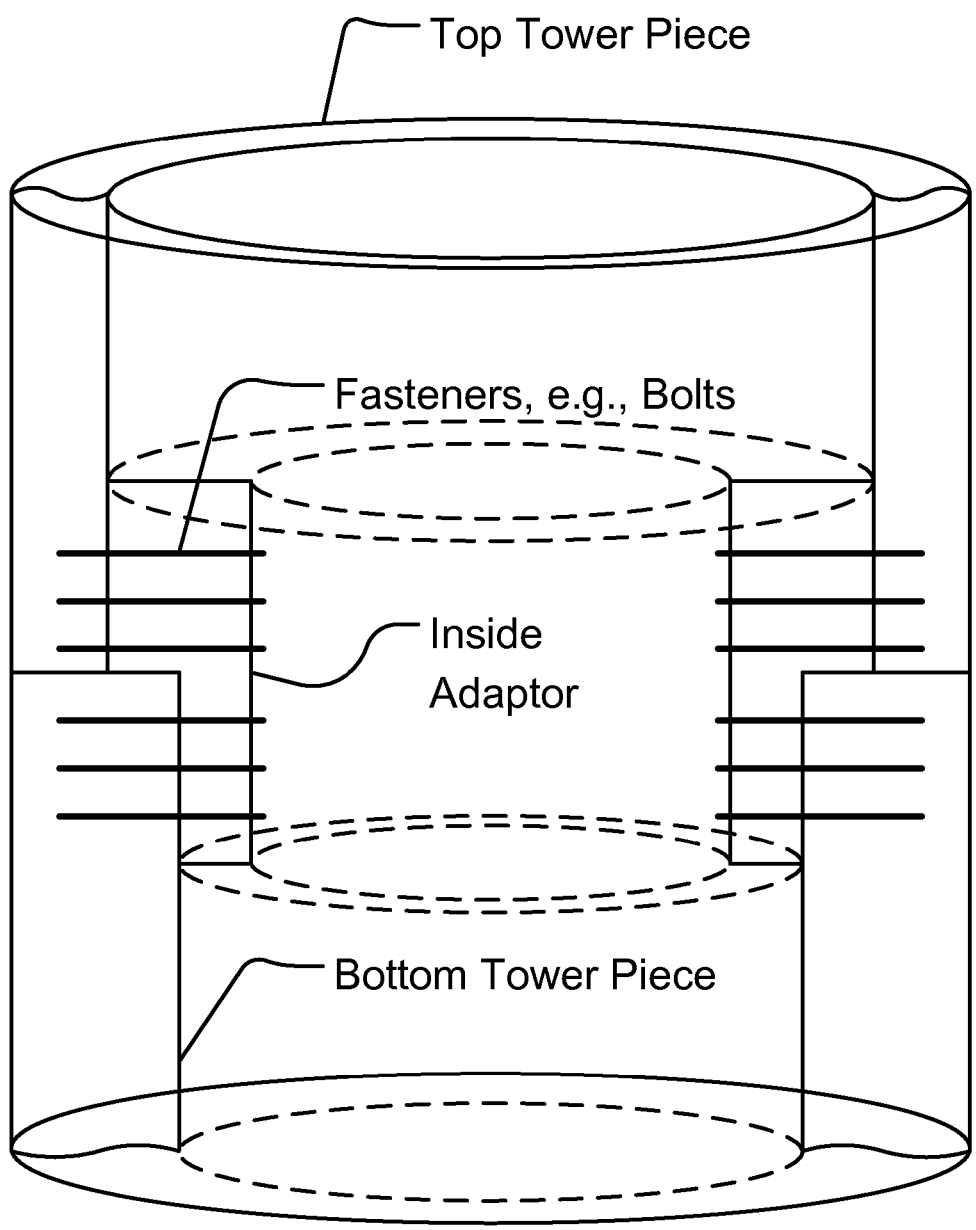
FIG. 33 shows one embodiment of this invention, for two sections on top of each other, with fasteners or pins for securing sections in place, for assembling a tower, and an adaptor (for temporary or permanent solution), for easier method of securing the fasteners or pins, during the assembly.

FIG. 33 shows one embodiment of this invention, for two sections on top of each other, with fasteners or pins for securing sections in place, for assembling a tower, and an adaptor (for temporary or permanent solution), for easier method of securing the fasteners or pins, during the assembly.

Figure 34:
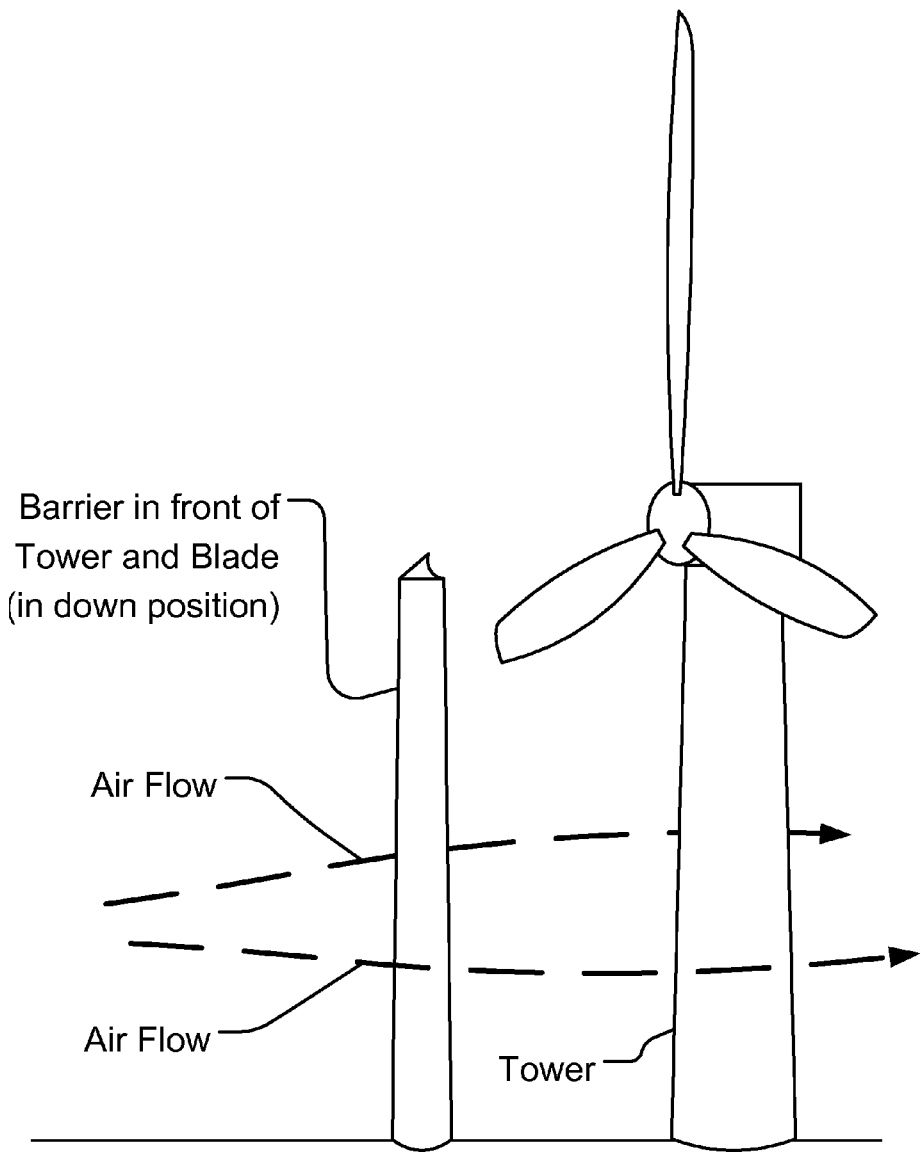
FIG. 34 shows one embodiment of this invention, for a wall or barrier in front of the blades of a tower, for example, with the cross section as a triangular shape or curved shape, or arrow head, for the cross section in front of the generated air pattern, so that the air going around the blade and tower has more aerodynamic pattern. That produces less fatigue/pressure on the system, and also, more efficiency for electric generation, and longer lifetime for blades and components.

FIG. 34 shows one embodiment of this invention, for a wall or barrier in front of the blades of a tower, for example, with the cross section as a triangular shape or curved shape, or arrow head, for the cross section in front of the generated air pattern, so that the air going around the blade and tower has more aerodynamic pattern. That produces less fatigue/pressure on the system, and also, more efficiency for electric generation, and longer lifetime for blades and components.

Figure 35:
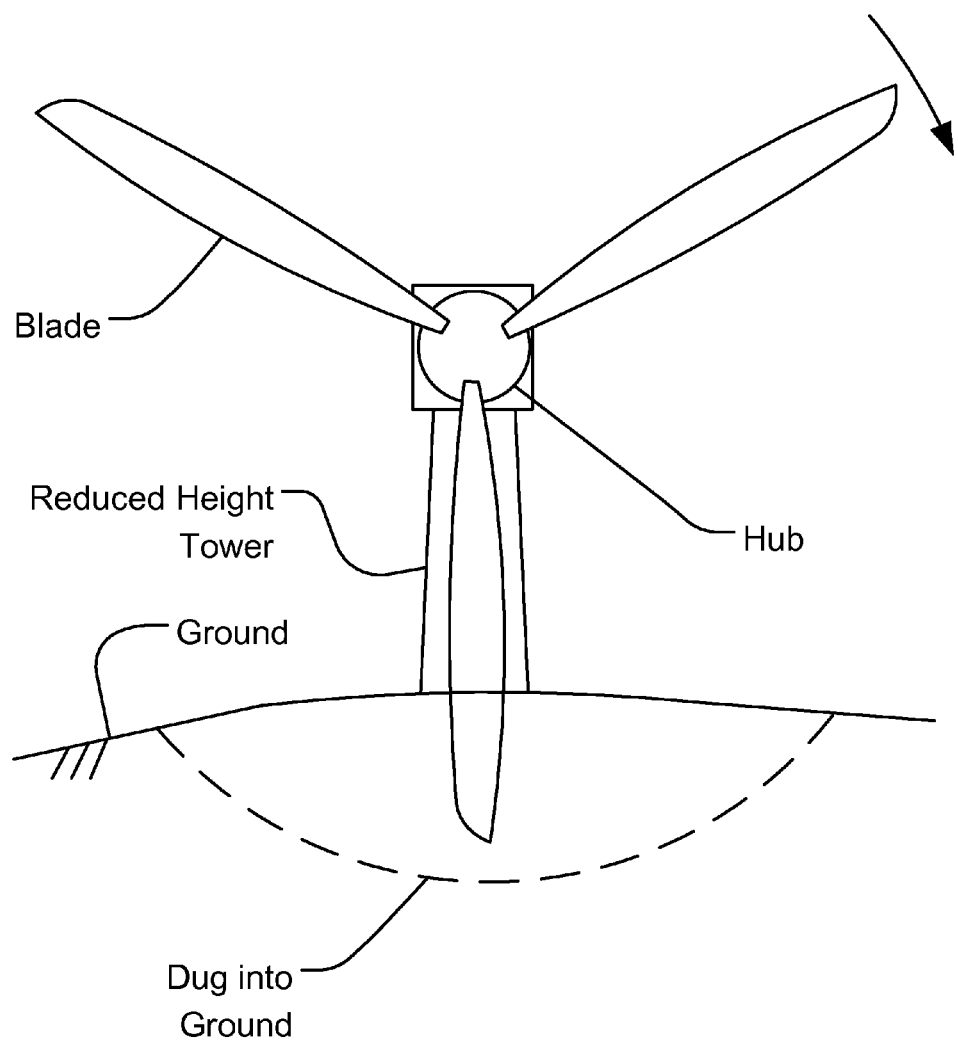
FIG. 35 shows one embodiment of this invention, for a hole in the ground as a small semicircle, or a small curved in-ground structure, for which the blade can go below the ground level during rotation. This can be done with the sea level as well. The in-ground structure should have a pump, or a drain hole, or being enclosed so that the water does not go in from the sides. This way, the distance of the shaft from ground level is smaller than the length of the blade, or radius of circle of rotation. That produces less fatigue/pressure on the system, and also, more efficiency for electric generation, and longer lifetime for blades and components.

FIG. 35 shows one embodiment of this invention, for a hole in the ground as a small semicircle, or a small curved in-ground structure, for which the blade can go below the ground level during rotation. This can be done with the sea level as well. The in-ground structure should have a pump, or a drain hole, or being enclosed so that the water does not go in from the sides. This way, the distance of the shaft from ground level is smaller than the length of the blade, or radius of circle of rotation. That produces less fatigue/pressure on the system, and also, more efficiency for electric generation, and longer lifetime for blades and components.

Figure 36:
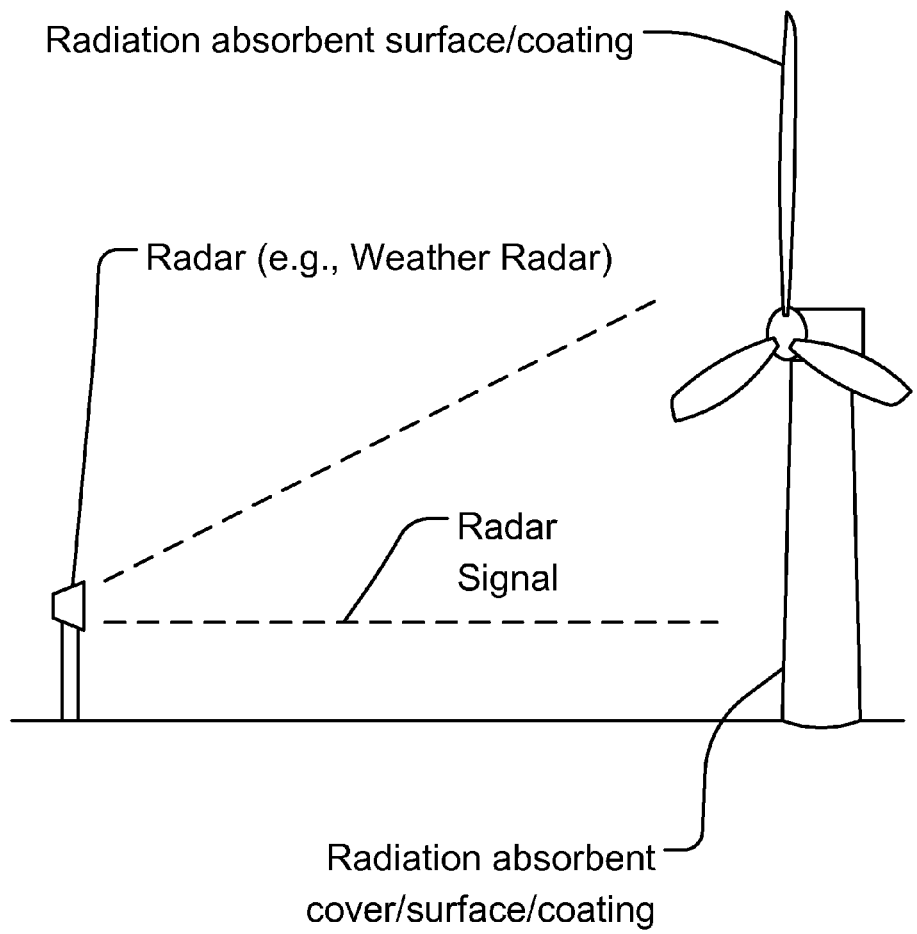
FIG. 36 shows one embodiment of this invention, for a radar absorbent material covering or attached or painted on most or all surfaces, such as tower and blades, so that the radar does not detect that as enemy plane, for example, by mistake. For example, it can be a coarse surface, non-reflecting for that wavelength/frequency.

FIG. 36 shows one embodiment of this invention, for a radar absorbent material covering or attached or painted on most or all surfaces, such as tower and blades, so that the radar does not detect that as enemy plane, for example, by mistake. For example, it can be a coarse surface, non-reflecting for that wavelength/frequency.

Figure 37:
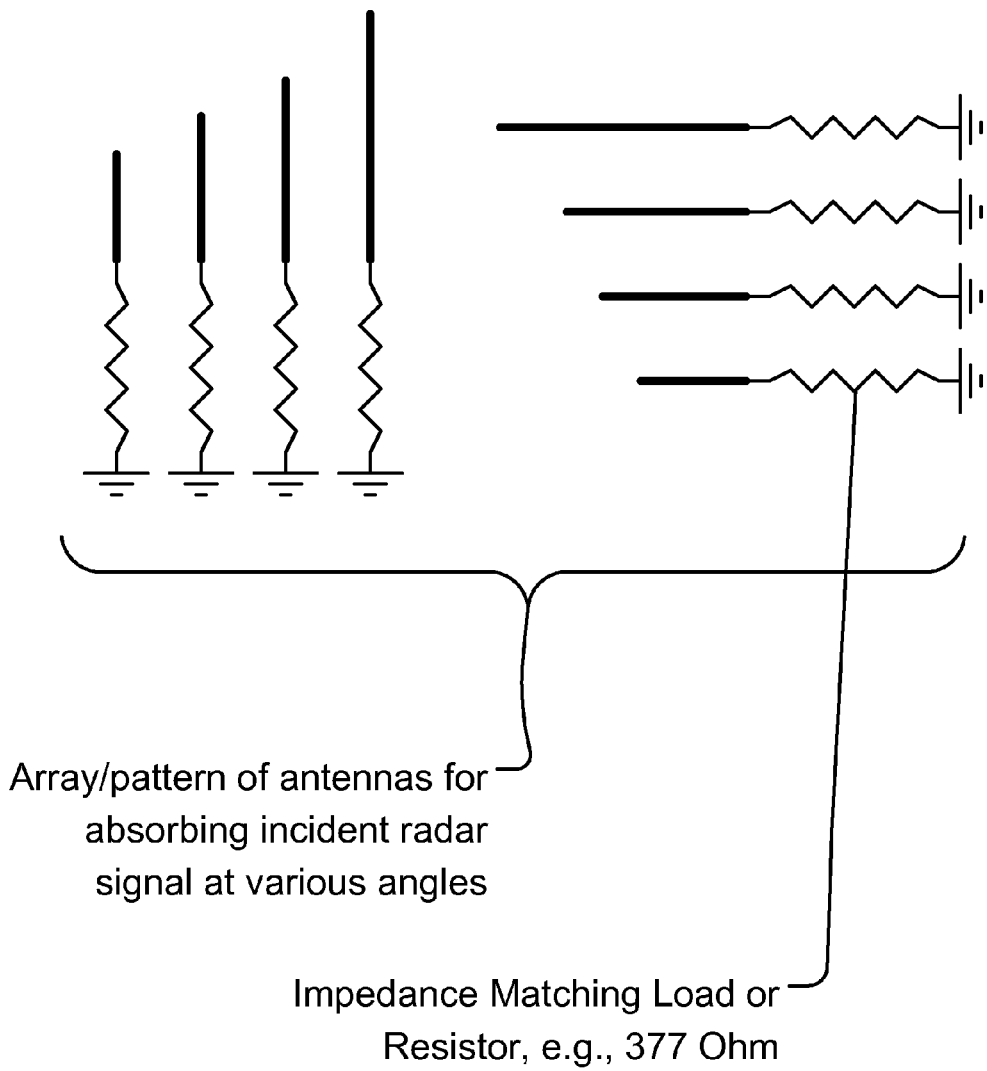
FIG. 37 shows one embodiment of this invention, for multiple antennas, as a mesh, array or matrix, grounded, as an example of a solution for FIG. 36. We have ($\lambda/4$) for the length of antenna, where $\lambda$ is the wavelength of the electromagnetic wave, between S band and X band or C band, as an example. In one example, the impedance is matched with impedance of air, which is about 377 ohms, as an example, in some conditions.

FIG. 37 shows one embodiment of this invention, for multiple antennas, as a mesh, array or matrix, grounded, as an example of a solution for FIG. 36. We have ($\lambda/4$) for the length of antenna, where $\lambda$ is the wavelength of the electromagnetic wave, between S band and X band or C band, as an example.

In one example, the impedance is matched with impedance of air, which is about 377 ohms, as an example, in some conditions.

In one embodiment, we change the angle of attack along the weight of the blade based on wind velocity and direction, or weather conditions and parameters. In one embodiment, we have a blade with multiple pieces, along its length. In that case, the angle of attack can be adjusted piecewise, along the blade for the pieces of the blade, for optimization.

In one embodiment, for a vertical axis windmill, the friction and wear-and-tear is greatly reduced, and the lifetime is greatly increased, when the system for generator is made of a magnetic material, and the system is installed across a very strong magnet, located on top and bottom of the system, so that the system is floated on a cushion of air, with minimum friction, during rotation.

Anywhere in this disclosure, for the purposes teaching the features of the invention, wind turbine and wind mill are interchangeable.

Any variations of the above teaching are also intended to be covered by this patent application.

The invention claimed is:

1. A method of assembling a tower for windmill, wind turbine, or wind-based electrical generator, said method comprising:
    putting a first section of a tower on ground or a floating sea object;
    assembling a crane on a top edge of outermost part of said first section of said tower;
    wherein said first section is lowest part of said tower;
    assembling other sections of said tower into a telescopically-folded structure, inside each other, located inside said first section of said tower; and
    said crane lifting a next section of said tower, out of said telescopically-folded structure.

2. The method of assembling a tower for windmill, wind turbine, or wind-based electrical generator as recited in claim 1, further comprising: adding pins, rods, blocks, or stoppers, to hold a lifted section in a permanent place.

3. The method of assembling a tower for windmill, wind turbine, or wind-based electrical generator as recited in claim 1, further comprising: adding pins, rods, blocks, or stoppers, to hold said telescopically-folded structure together as one piece.

4. The method of assembling a tower for windmill, wind turbine, or wind-based electrical generator as recited in claim 1, further comprising: removing pins, rods, blocks, or stoppers, to ungroup or unfold said telescopically-folded structure into smaller sections.

5. The method of assembling a tower for windmill, wind turbine, or wind-based electrical generator as recited in claim 1, wherein said tower has a circular, square-shaped, triangular, polygonal, or rectangular horizontal cross-section.

6. The method of assembling a tower for windmill, wind turbine, or wind-based electrical generator as recited in claim 1, wherein said first section has a notch, lip, edge, nick, ladder, railing, series of carved steps, trim, series of wall holes, chain, stopper, coarse surface, or indentation.

7. The method of assembling a tower for windmill, wind turbine, or wind-based electrical generator as recited in claim 1, wherein said other sections have a notch, lip, edge, nick, ladder, railing, series of carved steps, trim, series of wall holes, chain, stopper, coarse surface, or indentation.

8. The method of assembling a tower for windmill, wind turbine, or wind-based electrical generator as recited in claim 1, further comprising: using a hydraulic lift or high pressure gas or liquid to lift a section of said tower.

9. The method of assembling a tower for windmill, wind turbine, or wind-based electrical generator as recited in claim 1, further comprising: using a chain, cable, railing, or pulley to lift a piece of a blade for said tower.

10. The method of assembling a tower for windmill, wind turbine, or wind-based electrical generator as recited in claim 1, further comprising: attaching a piece of a blade for said tower to another piece of a blade for said tower.

11. The method of assembling a tower for windmill, wind turbine, or wind-based electrical generator as recited in claim 1, further comprising: attaching a piece of a blade for said tower to a rotor of said tower.

12. The method of assembling a tower for windmill, wind turbine, or wind-based electrical generator as recited in claim 1, further comprising: securing or attaching or locking one section of said tower on top of another section of said tower.

13. The method of assembling a tower for windmill, wind turbine, or wind-based electrical generator as recited in claim 1, further comprising: assembling all pieces of a blade on ground level.

14. The method of assembling a tower for windmill, wind turbine, or wind-based electrical generator as recited in claim 1, further comprising: lifting all pieces of a blade as one unit with a rotor, from ground level.

15. The method of assembling a tower for windmill, wind turbine, or wind-based electrical generator as recited in claim 1, further comprising: securing or locking a blade or rotor, against rotation or movement, during assembly.

16. The method of assembling a tower for windmill, wind turbine, or wind-based electrical generator as recited in claim 1, further comprising: suspending a rotor using a finished blade, hanging vertically, by said crane;
    wherein said suspended rotor is positioned close to bottom of said first section of said tower.

17. The method of assembling a tower for windmill, wind turbine, or wind-based electrical generator as recited in claim 16, further comprising: attaching a piece of a second blade on said suspended rotor by said crane.

18. The method of assembling a tower for windmill, wind turbine, or wind-based electrical generator as recited in claim 17, further comprising: attaching a piece of a third blade on said suspended rotor by said crane.

19. The method of assembling a tower for windmill, wind turbine, or wind-based electrical generator as recited in claim 1, further comprising: attaching symmetrically-positioned cables, wires, chains, ropes, connectors, rods, or strings from said crane to said next section of said tower.

20. The method of assembling a tower for windmill, wind turbine, or wind-based electrical generator as recited in claim 1, further comprising: lifting selected one or more sections of said telescopically-folded structure, by said crane.

* * * * *